(12) United States Patent
Otsubo et al.

(10) Patent No.: US 8,771,410 B2
(45) Date of Patent: Jul. 8, 2014

(54) INK FOR BALLPOINT PENS AND BALLPOINT PEN USING SAME

(75) Inventors: Aya Otsubo, Tokyo (JP); Ikuo Takagishi, Tokyo (JP); Kiyonori Yasuike, Tokyo (JP); Hiroki Kimura, Tokyo (JP); Takashi Sekine, Tokyo (JP)

(73) Assignee: Pentel Kabushiki Kaisha (JP)

( * ) Notice: Subject to any disclaimer, the term of this patent is extended or adjusted under 35 U.S.C. 154(b) by 174 days.

(21) Appl. No.: 13/138,217

(22) PCT Filed: Jan. 22, 2010

(86) PCT No.: PCT/JP2010/050848
§ 371 (c)(1),
(2), (4) Date: Jul. 20, 2011

(87) PCT Pub. No.: WO2010/084971
PCT Pub. Date: Jul. 29, 2010

(65) Prior Publication Data
US 2011/0271870 A1   Nov. 10, 2011

(30) Foreign Application Priority Data

Jan. 23, 2009 (JP) .................. P2009-013517
May 22, 2009 (JP) .................. P2009-124641
Dec. 18, 2009 (JP) .................. P2009-287974

(51) Int. Cl.
*C09D 11/02* (2014.01)
*C09D 11/18* (2006.01)

(52) U.S. Cl.
USPC .............. 106/31.59; 106/31.58; 106/31.86; 106/31.89

(58) Field of Classification Search
USPC ............... 106/31.58, 31.86, 31.89, 31.59
See application file for complete search history.

(56) References Cited

U.S. PATENT DOCUMENTS

| 6,776,829 B2 * | 8/2004 | Miyamoto et al. ......... 106/31.58 |
| 2002/0139280 A1 | 10/2002 | Ichikawa ................... 106/31.43 |
| 2003/0196568 A1 | 10/2003 | Miyamoto et al. ......... 106/31.58 |
| 2005/0207824 A1 | 9/2005 | Ichikawa ..................... 401/209 |
| 2006/0117996 A1 * | 6/2006 | Ichikawa et al. ........... 106/31.86 |
| 2007/0204761 A1 * | 9/2007 | Sugimoto .................. 106/31.58 |

FOREIGN PATENT DOCUMENTS

| EP | 1473342 | 11/2004 |
| JP | 61281171 | 12/1986 |
| JP | 2022883 | 2/1990 |
| JP | 7242852 | 9/1995 |
| JP | 8252998 | 10/1996 |
| JP | 2712273 | 10/1997 |

(Continued)

OTHER PUBLICATIONS

Chinese Office Action mailed Mar. 19, 2013 (with English-language translation) issued in Chinese Appln. No. 201080006141.4.

*Primary Examiner* — Veronica F Faison
(74) *Attorney, Agent, or Firm* — Adams & Wilks

(57) ABSTRACT

An ink composition for ballpoint pens comprises a coloring agent, a liquid medium, a polyoxyethylene castor oil and/or a polyoxyethylene hardened castor oil, or a derivative thereof, and one compound or a mixture of two or more compounds selected from the group consisting of a monoalkyl ether phosphoric acid, a polyoxyethylene monoalkyl ether phosphoric acid, a dialkyl ether phosphoric acid, a polyoxyethylene dialkyl ether phosphoric acid, a trialkyl ether phosphoric acid, and a polyoxyethylene trialkyl ether phosphoric acid.

10 Claims, 5 Drawing Sheets

(56) References Cited

FOREIGN PATENT DOCUMENTS

| JP | 10279876 | 10/1998 |
| JP | 2003105245 | 4/2003 |
| JP | 200467769 | 3/2004 |
| JP | 2006089736 | 4/2006 |
| JP | 2007297517 | 11/2007 |
| JP | 2008274144 | 11/2008 |
| JP | 20091761 | 1/2009 |

* cited by examiner

INK FOR BALLPOINT PENS AND BALLPOINT PEN USING SAME

CROSS-REFERENCE TO RELATED APPLICATIONS

This application is a U.S. national stage application of International Application No. PCT/JP2010/050848 filed Jan. 22, 2010, claiming an earliest priority date of Jan. 23, 2009, and published in a non-English language.

BACKGROUND OF THE INVENTION

1. Technical Field

The present invention relates to a ballpoint pen ink containing a lubricating component. The present invention also relates to a ballpoint pen using the ink and having a ballpoint pen tip comprising at least a ball as a writing member and a ball holder holding the ball in the state of the ball being partially projected from the front-end opening.

2. Background Art

In order to obtain a ballpoint pen ink ensuring a soft and smooth writing feel, attempts to adjust the viscosity of the ink or add a material imparting lubricity to the ink have been made.

When the viscosity of the ink is reduced by adjusting the amount of the thickener added, since the resistance to rotation of the ball decreases in writing, there is an advantage which allows for writing with a soft writing feel. However, since the ink has a low viscosity, the ink film formed between the ball and the ball receiving seat to easily moves by writing pressure, and an uneven feel due to direct hitting of the ball on the ball receiving seat during writing is transmitted to the hand, as a result, the writing lacks a smooth feel.

On the other hand, when the viscosity of the ink is raised by adding a resin or the like and the thickness of the ink film formed between the ball and the ball receiving seat is increased, although a smooth writing feel may be obtained, rotation of the ball is subject to large resistance due to low fluidity of the ink to give a heavy writing feel.

Also, for satisfying both a soft feel and a smooth feel in writing, an attempt to impart pseudo-plastic viscosity characteristics to the ink by using a shear-thinning agent which imparts viscosity has been made so as to lower the viscosity by a high shear force applied to the ink due to rotation of the ball during writing and to reduce the rotation resistance of the ball (Patent Document 1, from page 2, right column, line 36 to page 3, right column, line 23).

Furthermore, when a material for imparting lubricity to the ink, such as phosphoric acid ester (Patent Document 2, from page 2, right column, line 32 to page 3, right column, line 30), dipolyoxyethylene alkyl ether phosphoric acid and tripolyoxyethylene alkyl ether phosphoric acid (Patent Document 3, from page 2, right column, line 23 to page 3, right column, line 15), is added to the ink, the frictional resistance between the ball and the ball receiving seat during writing is reduced and a smooth writing feel is obtained. An attempt to obtain softer and smoother writing by combining such a material for imparting lubricity to the ink and a thickener for adjusting the viscosity has been also made (Patent Document 4, from page 2, left column, line 28 to page 3, left column, line 26). Additionally, an attempt to add polyoxyethylene hardened castor oil that is a new pen starvation inhibitor but has a lubricating effect (Patent Document 5, from page 1, column 2, line 15 to page 2, column 3, line 2) or an attempt to add polyoxyalkylene hardened castor oil and an unsaturated fatty acid in which the carbon number of a hydrocarbon group bound to a carboxyl group is 17 or more (Patent document 6, from page 3, line 3 to page 3, line 5), has been also made.

In order to obtain a ballpoint pen with a good writing feel, a ballpoint pen wherein the diameter of the ball receiving seat part and the diameter of the center hole are specified has been disclosed in the invention of JP-U1-2-022883 (Patent Document 7, claims).

Furthermore, a ballpoint pen wherein the projected area of the ball seat is specified so as to obtain a smooth and soft writing feel is disclosed in the invention of JP-A-8-252998 (Patent Document 8, claims).

RELATED ART

Patent Document

Patent Document 1: JP-A-2003-105245
Patent Document 2: JP-A-2002-201398
Patent Document 3: JP-A-10-279876
Patent Document 4: JP-A-07-242852
Patent Document 5: Japanese Patent No. 2,712,273
Patent Document 6: JP-A-2006-089736
Patent Document 7: JP-U1-2-022883
Patent Document 8: JP-A-8-252998

SUMMARY OF THE INVENTION

Problems that the Invention is to Solve

In the invention of Patent Document 1, since the viscosity of the ink is low during writing, a soft writing feel is obtained. However, the thickness of the ink film between the ball and the ball receiving seat is thin. As a result, there is a problem that the resistance due to friction caused by direct strong hitting of the ball on the ball holder is increased to inhibit smooth rotation of the ball and the writing feel lacks a smooth feel.

The phosphoric acid ester-type activator described in Patent Documents 2 and 3 is present in the form wherein a phosphoric acid group is bound to the metal surface of the ball and ball receiving seat with holding an alkyl group to the ink. As the lubricity imparted by the material is higher, the hydrophobicity of the alkyl group is stronger. Therefore, it becomes more difficult to have affinity between the metal surface of the ball and ball receiving seat covered with the phosphoric acid ester-type activator and a highly hydrophilic solvent having a hydroxyl group or an ether group, such as glycol ether, glycols and alcohols which are an organic solvent often used, for example, in an oil-based ballpoint pen. Thus, the adherence of the ink to the metal surface of the ball and ball receiving seat is reduced and the ink scarcely wets the metal surface. There is a problem that the rotation direction of the ball or the writing angle or speed is changed during writing to cause some change in the flow of the ink discharged or that a portion having no ink film between the ball and the ball receiving seat is produced by a strong force and an uneven feel due to momentary direct hitting of the ball on the ball receiving seat is transmitted to the hand to allow for writing with no smooth feel. Particularly, in the case of an ink having high viscosity, a heavy writing feel is liable to be caused and a large amount of a lubricant needs to be added. As a result, it is more difficult to wet the metal surface by the ink and the problem becomes more obvious.

Also, as the writing distance becomes longer, such a contact between the ball and the ball receiving seat more repeatedly occurs. Therefore, the abrasion of the receiving seat proceeds to cause sinking of the ball and the receded ball clogs the ink pathway to reduce the amount of the ink flowed.

In turn, the amount of the ink intervening between the ball and the ball receiving seat is also reduced, and direct contact therebetween readily occurs to impair the smooth flow. Excessive sinking of the ball may cause an adverse effect on handwriting, such as causing a blur written line. Furthermore, there is a problem that due to receding of the ball, when writing is performed by holding the writing tool obliquely, contact and rasping of the front end of the ball-holding ball holder of the ballpoint pen tip with paper is transmitted to the hand and the writing feel becomes bad.

Even when a material for imparting lubricity is added and at the same time, the viscosity of the ink is adjusted as in Patent Document 4, difficulty in wetting of the metal surface with the ink due to effect of the lubricant is not improved and a sufficiently soft and smooth writing feel cannot be obtained.

When a lubricant is added as in Patent Document 5 and 6, sustainability of lubricity is insufficient due to weak adsorption to metal and in the course of repeating the writing, the writing feel is disadvantageously deteriorated.

In the ballpoint pen tips disclosed in the above patent documents, since all ballpoint pen tips are specified by the projected dimension when the ballpoint pen tip is observed from the front end side (ball side) and the amount in the longitudinal direction (depth direction) is not taken into consideration, it cannot be said that the amount in the contact portion between the ball and the ball holder is substantially specified. Also, only the dimension of the ball receiving seat which is a part regulating ball retreat is taken into account. Usually, when writing is performed by holding a ballpoint pen obliquely at an angle of about 70° from the writing surface such as paper surface, the ball is pressed from the oblique direction; sometimes moves to an off-centered position; and due to contact of a portion other than the ball receiving seat, a smooth writing feel may be impaired.

As described above, a ballpoint pen ink which gives a very soft and smooth writing feel and maintains the writing feel even when the writing distance becomes long is not obtained by conventional techniques.

An object of the present invention is to provide a ballpoint pen ink and a ballpoint pen which ensure that a very soft and smooth writing feel is obtained and that the writing feel is not deteriorated with an increase in the writing distance.

SUMMARY OF THE INVENTION

Namely, the present invention relates to [1] a ballpoint pen ink containing at least a colorant, a liquid medium, a compound represented by the following formula (I), and one kind of a compound or a mixture of two or more kinds of compounds selected from any of the compounds of the following formulae (II), (III) and (IV):

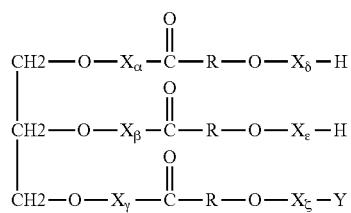

Formula (I)

(X: an ethylene oxide group, $CH_2CH_2O$,
Y: H, CR or $COCH_2CH_2COOH$,
R: a fatty acid or hydroxyl group-containing fatty acid having C12 or more, $\alpha+\beta+\gamma$=an integer of 1 or more, and
$\delta+\epsilon+\xi$=an integer of 1 or more);

[Chem. 2]

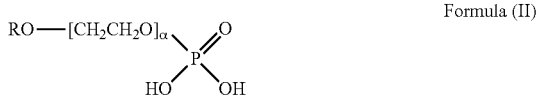

Formula (II)

(R: an alkyl group or a phenyl group, and
$\alpha$: an integer of 0 or more);

[Chem. 3]

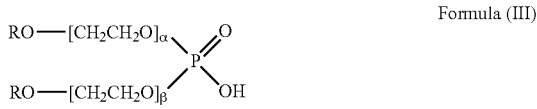

Formula (III)

(R: an alkyl group or a phenyl group, and
$\alpha+\beta$=an integer of 0 or more); and

[Chem. 4]

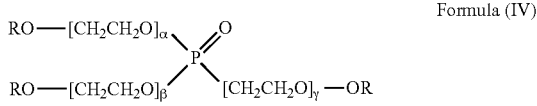

Formula (IV)

(R: an alkyl group or a phenyl group, and
$\alpha+\beta+\gamma$=an integer of 0 or more).

Additionally, the present invention relates to [2] ballpoint pen ink according to [1], wherein the value obtained by dividing the weight of the compound of formula (I) in the ink by the weight of one kind of a compound or a mixture of two or more kinds of compounds selected from any of the compounds of formulae (II), (III) and (IV) [weight of compound of formula (I)/{weight of compound of formula (II)+weight of compound of formula (III)+weight of compound of formula (IV)}] is from 0.1 to 0.100.

Furthermore, the present invention relates to [3] the ballpoint pen ink according to [2], wherein the value obtained by dividing the weight of the compound of formula (I) in the ink by the weight of one kind of a compound or a mixture of two or more kinds of compounds selected from any of the compounds of formulae (II), (III) and (IV) [weight of compound of formula (I)/{weight of compound of formula (II)+weight of compound of formula (III)+weight of compound of formula (IV)}] is from 0.1 to 20.

Furthermore, the present invention relates to [4] the ballpoint pen ink according to any one of [1] to [3], wherein 50 wt % or more of the liquid medium is an alcohol-based and/or a glycol-based solvent; and in the compound of formula (I) the value of $\alpha+\beta+\gamma+\delta+\epsilon+\xi$ is less than 80.

Furthermore, the present invention relates to [5] the ballpoint pen ink according to any one of [1] to [4], which contains at least one of a butyral resin, a styrene acrylic resin and a ketone resin.

Furthermore, the present invention relates to [6] a ballpoint pen comprising a ballpoint pen tip comprising at least a ball as a writing member and a ball holder holding the ball in the state of the ball being partially projected from the front-end opening, an ink storage member, and the ink described in [1] to [5], wherein the curvature of a ball transferred part formed by pressing an inner side surface of the ball holder to the surface of the ball is nearly equal to the curvature of the ball and the total area of the ball transferred part is from 22.0 to 31.0% of the surface area of the ball.

Effect of the Invention

The compound represented by formula (II) or (III) has a P—OH group in the molecule and therefore, when a metal of the ball or ball receiving seat is present, P-OM (M represents the metal of the ball or ball receiving seat) was formed by chemical binding. Furthermore, since the P=O group is strongly adsorbed on the metal surface of the ball or ball receiving seat, the metal surface is strongly covered. Although the compound represented by formula (IV) does not have a P—OH group, it has a P=O group. Therefore, it is sufficiently strong adsorbed on the metal of the ball or ball receiving seat. Since the compounds represented by formulae (II), (III) and (IV) are phosphoric acid derivatives, their molecular structure takes a tetrahedral structure with the phosphorus atom at the center. Namely, when the compound is adsorbed as a phosphoric acid on the metal surface, a polyoxyethylene alkyl ether group and/or a hydroxyl group are spread in the ink in the direction opposite the metal to form a tetrahedral structure. The compound represented by formula (I), which can be considered to be a glycerin derivative, takes a tetrahedral structure with the carbon on the 2-position of the glycerin moiety at the center, similarly with the compounds represented by formulae (II), (III) and (IV). It is considered that since all of these compounds takes a similar tetrahedral structure, the compound of formula (I) intrudes to sterically override the compound represented by formula (II), (III) or (IV) adsorbed on the tip metal, and the hydrophilic moiety and the hydrophobic moiety of both members have affinity for each other, whereby a by far firmer two-layer film than in other combinations can be formed. Therefore, since the ball or ball receiving seat can be densely covered with a film having a two-layer structure in which a layer of the compound of formula (I) is formed on a layer of the compound of formula (II), (III) or (IV), higher lubricity than in conventional combinations of lubricants can be obtained and the lubricity can be maintained for a long time.

At this time, since each fatty acid group of the compound represented by formula (I) has a structure is sandwiched by two or more ethylene oxide groups, despite having a fatty acid group which is highly hydrophobic, the molecular chain is readily extended in the ink by spreading the hydrophilic ethylene oxide group in the ink. Accordingly, there is a strong interaction with the solvent in the ink, for example, water or a highly hydrophilic solvent having a hydroxyl group or an ether bond, such as glycol ethers, glycols and alcohols which are an organic solvent often used in an oil-based ballpoint pen, and this enables keeping the ink layer formed on the metal surface from breakage even with a strong writing pressure force and maintaining high lubricity. At the same time, abrasion of the ball receiving seat is suppressed; the amount of ink discharged (amount of ink flowed) is not greatly changed; a soft and smooth writing feel is maintained; and handwriting free from a problem such as a blur is sustained.

The value obtained by dividing the weight of the compound of formula (I) by the weight of one kind of a compound or a mixture of two or more kinds of compounds selected from the any compounds of formulae (II), (III) and (IV) [weight of compound of formula (I)/{weight of compound of formula (II)+weight of compound of formula (III)+weight of compound of formula (IV)}] is from 0.1 to 100, and in this range, the amount added of the compound of formula (I) based on the {weight of compound of formula (II)+weight of compound of formula (III)+weight of compound of formula (IV)} becomes optimal, whereby wettability of the ball receiving seat for ink is held and a very soft and smooth writing feel is maintained. As for the liquid medium of the ink, there are a case of using water and a case of using an organic solvent. In the case where 50 wt % or more in the entire liquid medium is an organic solvent (hereinafter, referred to as an "oil-based ink"), since $\alpha+\beta+\gamma+\delta+\epsilon+\xi$ of the compound represented by formula (I) is less than 80, the compound represented by formula (I) is kept from having excessively strong hydrophilicity and exhibits good solubility in an organic solvent. Therefore, a firm binding between the compound represented by formula (I) and the organic solvent is achieved, as result, an ink layer is easily maintained by the surface of the ball or ball receiving seat and a high lubricating effect can be expected.

Also, since a butyral resin, a styrene acrylic acid resin or a ketone resin has an excellent dissolving power in an organic solvent, ink has a good fluidity and the amount of ink discharged is easily kept, by which higher effect can be expected.

As for the ballpoint pen tip, the inner side surface of the ball holder is pressed to the surface of the ball, and a ball transferred part is formed by transferring the curved surface of the ball onto the inner side surface of the ball holder. At such formation of a ball transferred part, a spring back is generated in the contact boundary portion (for example, the front end or rear end of the ball holder) during processing. Therefore, the radius of curvature of the ball transferred part and the radius of curvature of the ball do not become completely the same. However, since there is a slight difference between the radius of curvature of the ball transferred part and the radius of curvature of the ball, a gap capable of reserving an ink is formed between the ball and the inside surface of the ball holder.

At this time, when the total area of the ball transferred part is from 22.0 to 31.0% of the surface area of the ball, a layer using the ink as a lubricant can be formed between the ball and the inner side surface of the ball holder. Additionally, a smooth feeling on writing is obtained without unnecessarily limiting the ink flow rate.

Furthermore, when the entire ball transferred part becomes a lubricating wall surface resulting from adsorption of a phosphoric acid ester compound, the lubricating wall surface exhibits good affinity for ink components and therefore, a thin ink layer can be formed. In turn, smooth rotation of the ball is ensured and a smoother writing feel is obtained.

In case where the total area of the ball transferred part is less than 22.0% of the surface area of the ball, the amount of the ink intervening in the portion receiving the force produced when the ball is pressed to the ball holder is insufficient, and smoothness of writing feel particularly at slanting writing is reduced. If the total area of the ball transferred part exceeds 31.0%, the amount of ink flowed becomes short, and a portion suffering from an ink transfer failure such as blur or missing is liable to be produced in handwriting.

DETAILED DESCRIPTION OF THE INVENTION

Figure 1:
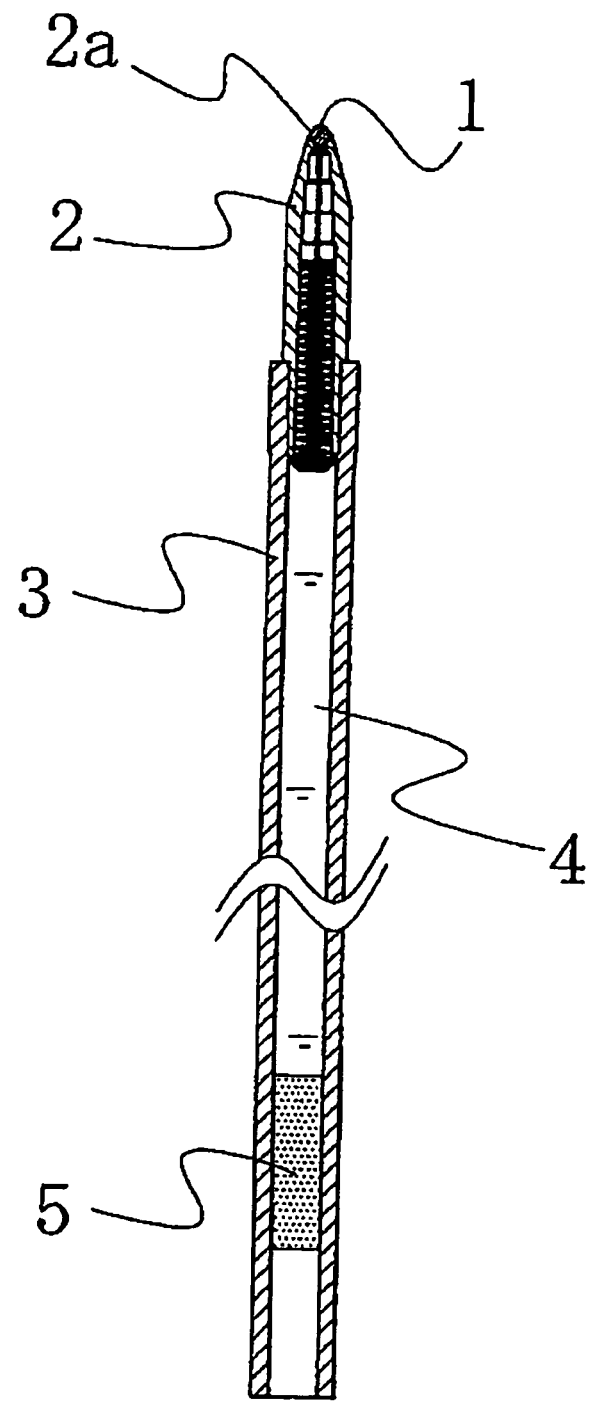
FIG. 1 is a longitudinal sectional figure showing one example of the ballpoint pen of the present invention.

The present invention is described in detail below.

As for the colorant used in the ink of the present invention, all of oil-soluble dyes and pigments conventionally used in the ballpoint pen ink can be used, and dye or pigment may be used alone or in combination.

Specific examples of the oil-soluble dye which can be used include conventionally known general dyes such as Rhodamine B base (C.I. 45170B, produced by Taoka Chemical Co., Ltd.); Solden Red 3R (C.I. 21260, produced by Chugai Kasei Co., Ltd.); Methyl Violet 2B base (C.I. 42535B, produced by National Aniline Div. in U.S.A.); Victoria Blue F4R (C.I. 42563B) and Nigrosine base LK (C.I. 50415) (both produced by BASF AG in Germany); VALIFAST Yellow #3104 (C.I. 13900A), VALIFAST Yellow #3105 (C.I. 18690), Orient Spirit Black AB (C.I. 50415), VALIFAST Black #3804 (C.I. 12195), VALIFAST Yellow #1109, VALIFAST Orange #2210, VALIFAST Red #1320, VALIFAST Blue #1605 and VALIFAST Violet #1701 (all produced by Orient Chemical Industries); Spilon Black GMH Special, Spilon Yellow C-2 GH, Spilon Yellow C-GNH, Spilon Red C-GH, Spilon Red C-BH, Spilon Blue BPNH, Spilon Blue C-RH, Spilon Violet C-RH, S.P.T. Orange 6 and S.P.T. Blue 111 (all produced by Hodogaya Chemical Co., Ltd.); and Neo Super Blue C-555 (produced by Chuo synthetic Chemical Co., Ltd.).

As for the water-soluble dye, all of an acidic dye, a direct dye, a basic dye and the like can be used. Examples thereof include direct dyes such as Japanol Fast Black D conc. (C.I. Direct Black 17), Water Black 100L (C. I. Direct Black 19), Water Black L-200 (C.I. Direct Black 19), Direct Fast Black B (C.I. Direct Black 22), Direct Fast Black AB (C.I. Direct Black 32), Direct Deep Black EX (C.I. Direct Black 38), Direct Fast Black conc. (C.I. Direct Black 51), Kayarus Supra Gray VGN (C.I. Direct Black 71), Kayarus Direct Brilliant Yellow G (C.I. Direct Yellow 4), Direct Fast Yellow 5GL (C.I. Direct Yellow 26), Aizen Primula Yellow GCLH (C.I. Direct Yellow 44), Direct Fast Yellow R (C.I. Direct Yellow 50), Aizen Direct Fast Red FH (C.I. Direct Red 1), Nippon Fast Scarlet GSX (C.I. Direct Red 4), Direct Fast Scarlet 4BS (C.I. Direct Red 23), Aizen Direct Rhodulin BH (C.I. Direct Red 31), Direct Scarlet B (C.I. Direct Red 37), Kayaku Direct Scarlet 3B (C.I. Direct Red 39), Aizen Primula Pink 2BLH (C.I. Direct Red 75), Sumilight Red F3B (C.I. Direct Red 80), Aizen Primula Red 4BH (C.I. Direct Red 81), Kayarus Supra Rubine BL (C.I. Direct Red 83), Kayarus Light Red F5G (C.I. Direct Red 225), Kayarus Light Red F5B (C.I. Direct Red 226), Kayarus Light Rose FR (C.I. Direct Red 227), Direct Sky Blue 6B (C.I. Direct Blue 1), Direct Sky Blue 5B (C.I. Direct Blue 15), Sumilight Supra Blue BRR conc. (C.I. Direct Blue 71), Daivogen Turquoise Blue S(C.I. Direct Blue 86), Water Blue #3 (C.I. Direct Blue 86), Kayarus Turquoise Blue GL (C.I. Direct Blue 86), Kayarus Supra Blue FF2GL (C.I. Direct Blue 106) and Kayarus Supra Turquoise Blue FBL (C.I. Direct Blue 199); acidic dyes such as Acid Blue Black 10B (C.I. Acid Black 1), Nigrosine (C.I. Acid Black 2), Suminol Milling Black 8BX (C.I. Acid Black 24), Kayanol Milling Black VLG (C.I. Acid Black 26), Suminol Fast Black BR conc. (C.I. Acid Black 31), Mitsui Nylon Black GL (C.I. Acid Black 52), Aizen Opal Black WH extra conc. (C.I. Acid Black 52), Sumilan Black WA (C.I. Acid Black 52), Lanyl Black BG extra conc. (C.I. Acid Black 107), Kayanol Milling Black TLB (C.I. Acid Black 109), Suminol Milling Black B (C.I. Acid Black 109), Kayanol Milling Black TLR (C.I. Acid Black 110), Aizen Opal black new conc. (C.I. Acid Black 119), Water Black 187-L (C.I. Acid Black 154), Kayaku Acid Brilliant Flavin FF (C.I. Acid Yellow 7:1), Kayacyl Yellow GG (C.I. Acid Yellow 17), Xylene Light Yellow 2G 140% (C.I. Acid Yellow 17), Suminol Leveling Yellow NR (C.I. Acid Yellow 19), Daiwa Tartrazine (C.I. Acid Yellow 23), Kayaku Tartrazine (C.I. Acid Yellow 23), Suminol Fast Yellow R (C.I. Acid Yellow 25), Diacid Light Yellow 2GP (C.I. Acid Yellow 29), Suminol Milling Yellow 0 (C.I. Acid Yellow 38), Suminol Milling Yellow MR (C.I. Acid Yellow 42), Water Yellow #6 (C.I. Acid Yellow 42), Kayanol Yellow NFG (C.I. Acid Yellow 49), Suminol Milling Yellow 3G (C.I. Acid Yellow 72), Suminol Fast Yellow G (C.I. Acid Yellow 61), Suminol Milling Yellow G (C.I. Acid Yellow 78), Kayanol Yellow N5G (C.I. Acid Yellow 110), Suminol Milling Yellow 4G 200% (C.I. Acid Yellow 141), Kayanol Yellow NG (C.I. Acid Yellow 135), Kayanol Milling Yellow 5GW (C.I. Acid Yellow 127), Kayanol Milling Yellow 6GW (C.I. Acid Yellow 142), Sumitomo Fast Scarlet A (C.I. Acid Red 8), Kayaku Silk Scarlet (C.I. Acid Red 9), Solar Rubine extra (C.I. Acid Red 14), Daiwa New Coccine (C.I. Acid Red 18), Aizen Ponceau RH (C.I. Acid Red 26), Daiwa Red No. 2 (C.I. Acid Red 27), Suminol Leveling Brilliant Red S3B (C.I. Acid Red 35), Kayacyl Rubinol 3GS (C.I. Acid Red 37), Aizen Erythrosine (C.I. Acid Red 51), Kayaku Acid Rhodamine FB (C.I. Acid Red 52), Suminol Leveling Rubinol 3GP (C.I. Acid Red 57), Diacid Alizarin Rubinol F3G 200% (C.I. Acid Red 82), Aizen Eosin GH (C.I. Acid Red 87), Water Pink #2 (C.I. Acid Red 92), Aizen Acid Phloxin PB (C.I. Acid Red 92), Rose Bengal (C.I. Acid Red 94), Kayanol Milling Scarlet FGW (C.I. Acid Red 111), Kayanol Milling Rubine 3BW (C.I. Acid Red 129), Suminol Milling Brilliant Red 3BN conc. (C.I. Acid Red 131), Suminol Milling Brilliant Red BS (C.I. Acid Red 138), Aizen Opal Pink BH (C.I. Acid Red 186), Suminol Milling Brilliant Red B conc. (C.I. Acid Red 249), Kayaku Acid Brilliant Red 3BL (C.I. Acid Red 254), Kayaku Acid Brilid Brilliant Red BL (C.I. Acid Red 265), Kayanol Milling Red GW (C.I. Acid Red 276), Mitsui Acid Violet 6BN (C.I. Acid Violet 15), Mitsui Acid Violet BN (C.I. Acid Violet 17), Sumitomo Patent Pure Blue VX (C.I. Acid Blue 1), Water Blue #106 (C.I. Acid Blue 1), Patent Blue AF (C.I. Acid Blue 7), Water Blue #9 (C.I. Acid Blue 9), Daiwa Blue No. 1 (C.I. Acid Blue 9), Supranol Blue B (C.I. Acid Blue 15), Orient Soluble Blue OBC (C.I. Acid Blue 22), Suminol Leveling Blue 4GL (C.I. Acid Blue 23), Mitsui Nylon Fast Blue G (C.I. Acid Blue 25), Kayacyl Blue AGG (C.I. Acid Blue 40), Kayacyl Blue BR C.I. Acid Blue 41), Mitsui Alizarin Saphirol SE (C.I. Acid Blue 43), Suminol Leveling Sky blue R extra conc. (C.I. Acid Blue 62), Mitsui Nylon Fast Sky Blue B (C.I. Acid Blue 78), Sumitomo Brilliant Indocyanine 6Bh/c (C.I. Acid Blue 83), Sandolan Cyanine N-6B 350% (C.I. Acid Blue 90), Water Blue #115 (C.I. Acid Blue 90), Orient Soluble Blue OBB (C.I. Acid Blue 93), Sumitomo Brilliant Blue 50 (C.I. Acid Blue 103), Kayanol Milling Ultra Sky SE (C.I. Acid Blue 112), Kayanol Milling Cyanine 5R (C.I. Acid Blue 113), Aizen Opal Blue 2GLH C.I. Acid Blue 158), Daiwa Guinea Green B (C.I. Acid Green 3), Acid Brilliant Milling Green B (C.I. Acid Green 9), Daiwa Green #70 (C.I. Acid Green 16), Kayanol Cyanine Green G (C.I. Acid Green 25) and Suminol Milling Green G (C.I. Acid Green 27); and basic dyes such as Aizen Cathilon Yellow 3GLH C.I. Basic Yellow 11), Aizen Cathilon Brilliant Yellow 5GLH C.I. Basic Yellow 13), Sumiacryl Yellow E-3RD (C.I. Basic Yellow 15), Maxilon Yellow 2RL (C.I. Basic Yellow 19), Astrazon Yellow 7GLL (C.I. Basic Yellow 21), Kayacryl Golden Yellow GL-ED (C.I.

Basic Yellow 28), Astrazon Yellow 5GL (C.I. Basic Yellow 51), Aizen Cathilon Orange GLH C.I. Basic Orange 21), Aizen Cathilon Brown 3GLH C.I. Basic Orange 30), Rhodamine 6GCP (C.I. Basic Red 1), Aizen Astra Phloxine (C.I. Basic Red 12), Sumiacryl Brilliant Red E-2B (C.I. (Basic Red 15), Astrazon Red GTL (C.I. Basic Red 18), Aizen Cathilon Brilliant Pink BGH C.I. Basic Red 27), Maxilon Red GRL (C.I. Basic Red 46), Aizen Methyl Violet (C.I. Basic Violet 1), Aizen Crystal Violet (C.I. Basic Violet 3), Aizen Rhodamine B (C.I. Basic Violet 10), Astrazon Blue G (C.I. Basic Blue 1), Astrazon Blue BG (C.I. Basic Blue 3), Methylene Blue (C.I. Basic Blue 9), Maxilon Blue GRL (C.I. Basic Blue 41), Aizen Cathilon Blue BRLH C.I. Basic Blue 54), Aizen Diamond Green GH C.I. Basic Green 1), Aizen Malachite Green (C.I. Basic Green 4) and Bismarck Brown G (C.I. Basic Brown 1).

The pigment is added for the purpose of enhancing the handwriting fastness or improving the flow characteristics of the ink, and examples thereof include an organic pigment such as azo-based pigment, quinacridone-based pigment, isoindolinone-based pigment, dioxane-based pigment, perinone, perylene-based pigment, diketopyrrolopyrrole pigment, aniline black, nitroso-based pigment and nitro-based pigment, an inorganic pigment such as iron oxide, carbon black, acetylene black, lamp black, bone black, iron black, titanium oxide, barium sulfate, cadmium red, red oxide, chromium yellow, ocher, cadmium yellow, barium yellow, ultramarine and iron blue, a fluorescent pigment, and a pigment obtained by coloring a resin particle with a dye, in which the resin used is not dissolved in the ink solvent. One of these pigments may be used alone, or a mixture of some pigments may be used.

Examples of the black pigment include carbon black such as Printex 3, Printex 25, Printex 30, Printex 35, Printex 40, Printex 45, Printex 55, Printex 60, Printex 75, Printex 80, Printex 85, Printex 90, Printex 95, Printex 300, Special Black 4, Special Black 5, Special Black 100, Special Black 250, Special Black 550 (all produced by Degussa-Huels Japan), Mitsubishi Carbon Black #2700, Mitsubishi Carbon Black #2650, Mitsubishi Carbon Black #2600, Mitsubishi Carbon Black #2400, Mitsubishi Carbon Black #2350, Mitsubishi Carbon Black #2300, Mitsubishi Carbon Black #2200, Mitsubishi Carbon Black #1000, Mitsubishi Carbon Black #990, Mitsubishi Carbon Black #980, Mitsubishi Carbon Black #970, Mitsubishi Carbon Black #960, Mitsubishi Carbon Black #950, Mitsubishi Carbon Black #900, Mitsubishi Carbon Black #850, Mitsubishi Carbon Black #750, Mitsubishi Carbon Black #650, Mitsubishi Carbon Black #52, Mitsubishi Carbon Black #50, Mitsubishi Carbon Black #47, Mitsubishi Carbon Black #45, Mitsubishi Carbon Black #45L, Mitsubishi Carbon Black #44, Mitsubishi Carbon Black #40, Mitsubishi Carbon Black #33, Mitsubishi Carbon Black #32, Mitsubishi Carbon Black #30, Mitsubishi Carbon Black #25, Mitsubishi Carbon Black #20, Mitsubishi Carbon Black #10, Mitsubishi Carbon Black #5, Mitsubishi Carbon Black #95, Mitsubishi Carbon Black #260, Mitsubishi Carbon Black CF9, Mitsubishi Carbon Black MCF88, Mitsubishi Carbon Black MA600, Mitsubishi Carbon Black MA77, Mitsubishi Carbon Black MA7, Mitsubishi Carbon Black MA11, Mitsubishi Carbon Black MA100, Mitsubishi Carbon Black MA100R, Mitsubishi Carbon Black MA100S, Mitsubishi Carbon Black MA220, Mitsubishi Carbon Black MA230 (all produced by Mitsubishi Chemical Corp.), TOKABLACK #8500/F, TOKABLACK #8300/F, TOKABLACK #7550SB/F, TOKABLACK #7400, TOKABLACK #7360SB/F, TOKABLACK #7350/F, TOKABLACK #7270SB, TOKABLACK #7100/F and TOKABLACK #7050 (all produced by Tokai Carbon Co., Ltd.); aniline black such as Diamond Black N (produced by Tamaoku Shikizai K.K.); and iron black such as Bone Black (produced by Mie Color Techno K.K.) and Tekka Black KN-320 (produced by Nippon Tekka K.K.).

Examples of the blue pigment which can be used include C.I. Pigment Blue 2, C.I. Pigment Blue 9, C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 17, C.I. Pigment Blue 28, C.I. Pigment Blue 29, C.I. Pigment Blue 36, C.I. Pigment Blue 60, C.I. Pigment Blue 68, C.I. Pigment Blue 76, C.I. Pigment Blue 80 etc.

Examples of the red pigment which can be used include C.I. Pigment Red 2, C.I. Pigment Red 3, C.I. Pigment Red 5, C.I. Pigment Red 8, C.I. Pigment Red 14, C.I. Pigment Red 17, C.I. Pigment Red 22, C.I. Pigment Red 23, C.I. Pigment Red 31, C.I. Pigment Red 48:1, C.I. Pigment Red 48:2, C.I. Pigment Red 48:3, C.I. Pigment Red 48:4, C.I. Pigment Red 53:1, C.I. Pigment Red 53:2, C.I. Pigment Red 57:1, C.I. Pigment Red 112, C.I. Pigment Red 122, C.I. Pigment Red 144, C.I. Pigment Red 146, C.I. Pigment Red 149, C.I. Pigment Red 166, C.I. Pigment Red 170, C.I. Pigment Red 175, C.I. Pigment Red 176, C.I. Pigment Red 177, C.I. Pigment Red 179, C.I. Pigment Red 184, C.I. Pigment Red 185, C.I. Pigment Red 187, C.I. Pigment Red 188, C.I. Pigment Red 202, C.I. Pigment Red 207, C.I. Pigment Red 208, C.I. Pigment Red 209, C.I. Pigment Red 210, C.I. Pigment Red 211, C.I. Pigment Red 213, C.I. Pigment Red 214, C.I. Pigment Red 242, C.I. Pigment Red 253, C.I. Pigment Red 254, C.I. Pigment Red 255, C.I. Pigment Red 256, C.I. Pigment Red 257, C.I. Pigment Red 264, C.I. Pigment Red 266, C.I. Pigment Red 268, C.I. Pigment Red 270, C.I. Pigment Red 272 etc.

Examples of the yellow pigment which can be used include C.I. Pigment Yellow 1, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 55, C.I. Pigment Yellow 73, C.I. Pigment Yellow 74, C.I. Pigment Yellow 79, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 109, C.I. Pigment Yellow 110, C.I. Pigment Yellow 111, C.I. Pigment Yellow 120, C.I. Pigment Yellow 128, C.I. Pigment Yellow 133, C.I. Pigment Yellow 136, C.I. Pigment Yellow 138, C.I. Pigment Yellow 139, C.I. Pigment Yellow 147, C.I. Pigment Yellow 151, C.I. Pigment Yellow 154, C.I. Pigment Yellow 155, C.I. Pigment Yellow 167, C.I. Pigment Yellow 173, C.I. Pigment Yellow 174, C.I. Pigment Yellow 175, C.I. Pigment Yellow 176, C.I. Pigment Yellow 180, C.I. Pigment Yellow 185, C.I. Pigment Yellow 191, C.I. Pigment Yellow 194, C.I. Pigment Yellow 213 etc.

Examples of the orange pigment include C.I. Pigment Orange 5, C.I. Pigment Orange 13, C.I. Pigment Orange 16, C.I. Pigment Orange 34, C.I. Pigment Orange 36, C.I. Pigment Orange 38, C.I. Pigment Orange 43, C.I. Pigment Orange 62, C.I. Pigment Orange 68, C.I. Pigment Orange 72, C.I. Pigment Orange 74 etc.

Examples of the green pigment which can be used include C.I. Pigment Green 7, C.I. Pigment Green 36, C.I. Pigment Green 37 etc.

Examples of the violet pigment which can be used include C.I. Pigment Violet 19, C.I. Pigment Violet 23 etc.

Such a colorant can be suitably used in an amount of 1 to 40 wt % based on the entire ink. If the amount used is less than 1 wt %, the handwriting is too faint and when a light fastness test or a solvent resistance test is performed, the amount of the colorant remaining on the paper surface is excessively small, which leads illegible handwriting. If the amount used exceeds 40 wt %, inability of writing is liable to occur due to insufficient dissolving in blending or clogging caused by time-dependent precipitation. One of these colorants may be used lone, or two or more kinds thereof may be used in combination.

Other than these pigments, a processed pigment may also be used. Examples thereof include Renol Yellow GG-HW30, Renol Yellow HR-HW30, Renol Orange RL-HW30, Renol Red HF2B-HW30, Renol Red FGR-HW30, Renol Red F5RK-HW30, Renol Carmine FBB-HW30, Renol Violet RL-HW30, Renol Blue B2G-HW30, Renol Blue CF-HW30, Renol Green GG-HW30, Renol Brown HFR-HW30, Renol Black R-HW30 (all produced by Clariant Japan K.K.), UTCO-001 Ellow, UTCO-012 Ellow, UTCO-021 Orange, UTCO-031 Red, UTCO-032 Red, UTCO-042 Violet, UTCO-051 Blue, UTCO-052 Blue, UTCO-061 Green, UTCO-591 Black, UTCO-592 Black (all produced by Dainichiseika Color & Chemicals Mfg. Co., Ltd.), MICROLITH Yellow 4G-A, MICROLITH Yellow MX-A, MICROLITH Yellow 2R-A, MICROLITH Brown 5R-A, MICROLITH Scarlet R-A, MICROLITH Red 2C-A, MICROLITH Red 3R-A, MICROLITH Magenta 2B-A, MICROLITH Violet B-A, MICROLITH Blue 4G-A and MICROLITH Green G-A (all produced by Ciba Specialty Chemicals).

The ballpoint pen ink of the present invention contains an organic solvent and/or water as the liquid medium and the above-described dye and/or pigment dissolved or dispersed in the liquid medium.

As for the organic solvent which is the main medium of the oil-based ink, those conventionally used in an oil-based ink may be used without any particular limitation, and glycol ethers, glycols and alcohols are specifically preferable.

One of these organic solvents may be used alone or some of them may be used in combination, and the amount of the organic solvent used is preferably from 10 to 90 wt % based on the total amount of the oil-based ink.

Examples include glycol ethers such as ethylene glycol monophenyl ether, ethylene glycol monobenzyl ether, ethylene glycol monomethyl ether, ethylene glycol dimethyl ether, ethylene glycol monoethyl ether, ethylene glycol monobutyl ether, ethylene glycol monoisobutyl ether, ethylene glycol dibutyl ether, ethylene glycol monoisopropyl ether, ethylene glycol monohexyl ether, ethylene glycol mono-2-ethylhexyl ether, ethylene glycol monoallyl ether, diethylene glycol monophenyl ether, diethylene glycol monobenzyl ether, diethylene glycol monomethyl ether, diethylene glycol dimethyl ether, diethylene glycol monoethyl ether, diethylene glycol diethyl ether, diethylene glycol monobutyl ether, diethylene glycol monoisobutyl ether, diethylene glycol dibutyl ether, diethylene glycol monohexyl ether, diethylene glycol mono-2-ethylhexyl ether, triethylene glycol monomethyl ether, triethylene glycol dimethyl ether, triethylene glycol monobutyl ether, polyethylene glycol monomethyl ether, propylene glycol monomethyl ether, propylene glycol monomethyl ether acetate, propylene glycol monoethyl ether, propylene glycol monopropyl ether, propylene glycol monobutyl ether, propylene glycol tertiary-butyl ether, propylene glycol monophenyl ether, dipropylene glycol monomethyl ether, dipropylene glycol dimethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monobutyl ether and 3-methyl-3-methoxy-1-butyl acetate, glycols such as ethylene glycol, diethylene glycol, triethylene glycol, propylene glycol, dipropylene glycol, hexylene glycol, octylene glycol, glycerin, polyethylene glycol, 3-methyl-1,3-butanediol, 1,3-propanediol, 1,3-butanediol, 1,5-pentanediol, 2-ethyl-1,3-hexane glycol, diglycerin and polypropylene glycol, alcohols such as benzyl alcohol, β-phenylethyl alcohol, α-methylbenzyl alcohol, ethanol, 1-propanol, 2-propanol, 1-butanol, 2-butanol, 3-methoxy-1-butanol, 3-methyl-3-methoxy-1-butanol, 3-methyl-3-methoxypentanol, lauryl alcohol, tridecyl alcohol, isodecyl alcohol and isotridecyl alcohol, ethers such as methyl isopropyl ether, ethyl ether, ethylpropyl ether, ethylbutyl ether, isopropyl ether, butyl ether, hexyl ether and 2-ethylhexyl ether, esters such as 2-ethylhexyl acetate, isobutyl isobutyrate, ethyl lactate and butyl lactate, thiodiglycol, and N-methylpyrrolidone.

Among these, in view of a high dissolving power of solid materials in the ink and an appropriate boiling point, phenol cellosolve, benzyl alcohol, benzyl glycol, diethylene glycol monomethyl ether, ethylene glycol monoisopropyl ether and diethylene glycol monoisobutyl ether are preferable.

Also, among these organic solvents, when an alcohol such as ethanol, 1-propanol, 2-propanol and butyl alcohol, a glycol such as ethylene glycol, propylene glycol, 1,3-butanediol, hexylene glycol, 2-ethyl-1,3-hexane glycol, glycerin, triethylene glycol, dipropylene glycol, diglycerin, polyethylene glycol and polypropylene glycol, an ether such as ethylene glycol monoethyl ether, ethylene glycol monomethyl ether, ethylene glycol monobutyl ether and diethylene glycol monoethyl ether, a thiodiglycol, an N-methylpyrrolidone or an ethylene glycol monophenyl ether is contained in an amount of 0.1 wt % or more based on the total amount of the liquid medium, an effect of preventing drying, freezing or the like of the ink can be expected. Additionally, such an organic solvent is particularly effective in an aqueous ink containing 50 wt % or more of water based on the entire liquid medium.

The compound represented by formula (I) is polyoxyethylene castor oil, polyoxyethylene hardened castor oil or a derivative thereof, and examples of the commercial product thereof include NIKKOL HCO-5, NIKKOL HCO-10, NIKKOL HCO-20, NIKKOL HCO-30, NIKKOL HCO-40, NIKKOL HCO-50, NIKKOL HCO-60, NIKKOL HCO-80, NIKKOL HCO-100 (all produced by Nikko Chemicals Co., Ltd.), EMALEX HC-5, EMALEX HC-7, EMALEX HC-10, EMALEX HC-20, EMALEX HC-30, EMALEX HC-40, EMALEX HC-50, EMALEX HC-60, EMALEX HC-80, EMALEX HC-100 (all produced by Nihon Emulsion Co., Ltd.), Blaunon BR-404, Blaunon BR-407, Blaunon BR-410, Blaunon BR-4135, Blaunon BR-417, Blaunon BR-420, Blaunon BR-425, Blaunon BR-430, Blaunon BR-450, Blaunon RCW-20, Blaunon RCW-40, Blaunon RCW-60, Blaunon RCW-80, Blaunon RCW-100 (all produced by Nissin-Kasei Co., Ltd.), UNIOX HC-10, UNIOX HC-20, UNIOX HC-40, UNIOX HC-60, UNIOX HC-100, UNIOX HC-20ML, UNIOX HC-40ML, UNIOX HC-20MIS, UNIOX HC-40MIS, UNIOX HC-60MIS, UNIOX HC-50MSU, and NONION C-2300 (all produced by NOF Corporation). Such a compound is preferably added in an amount of 0.01 to 20 wt % based on the total amount of the ink. If the amount added is less than 0.01 wt %, the effect by the addition is not sufficiently exerted, whereas if added in excess of 20 wt %, the content of water or organic solvent in the ink is decreased, which causes insufficient solubility of solid contents such as dye and resin in the ink, and blur of characters is readily generated. One of these compounds may be used alone, or two or more thereof may be used in combination.

In an oil-based ink, if the value of $\alpha+\beta+\gamma+\delta+\epsilon+\xi$ is 80 mol or more, the ink stored under high-humidity conditions readily absorbs moisture and other materials are deteriorated in the solubility due to water in the ink and precipitated. For this reason, the value is preferably less than 80 mol, more preferably from 5 to 40 mol, and when the value is from 10 to 20 mol and the main component of R in the compound of formula (I) is a C17 fatty acid residue, a good writing feel can be obtained. Specific preferable compounds satisfying the requirements above include NIKKOL HCO-10, NIKKOL HCO-20, EMALEX HC-10, EMALEX HC-20, Blaunon BR-410, Blaunon BR-4135, Blaunon BR-417, Blaunon BR-420, Blaunon RCW-20, UNIOX HC-10, UNIOX HC-20, UNIOX HC-20ML and UNIOX HC-20MIS.

The compound represented by any of formulae (II), (III) and (IV) is a monoalkyl ether phosphoric acid, a polyoxyethylene monoalkyl ether phosphoric acid, a dialkyl ether phosphoric acid, a polyoxyethylene dialkyl ether phosphoric acid, a trialkyl ether phosphoric acid, a polyoxyethylene trialkyl ether phosphoric acid, or a neutralization product or solution thereof. Examples of the commercial product as a mixture of the compound represented by formula (II) and the compound represented by formula (III) include Phosphanol BH-650, Phosphanol SM-172, Phosphanol ED-200, Phosphanol GF-339, Phosphanol RA-600, Phosphanol GF199, Phosphanol ML-200, Phosphanol ML-220, Phosphanol ML-240, Phosphanol RD-510Y, Phosphanol GF-185, Phosphanol RS-410, Phosphanol RS-610, Phosphanol RS-710, Phosphanol RL-210, Phosphanol RL-310, Phosphanol RB-410, Phosphanol RP-710, Phosphanol AK-25, Phosphanol GF702, Phosphanol RS-610NA, Phosphanol SC-6103, Phosphanol RD-720, Phosphanol LP-700, Phosphanol LS-500, Phosphanol LB-400 (all produced by Toho Chemical Industry Co., Ltd.), PLYSURF A208B, PLYSURF A219B, PLYSURF A208S, PLYSURF A212S, and PLYSURF A215C (all produced by Dai-Ichi Kogyo Seiyaku Co., Ltd.). Examples of the compound represented by formula (III) include NIKKOL DLP-10, NIKKOL DOP-8NV, NIKKOL DDP-2, NIKKOL DDP-4, NIKKOL DDP-6, NIKKOL DDP-8 and NIKKOL DDP-10 (all produced by Nikko Chemicals Co., Ltd.), and examples of the compound represented by formula (IV) include NIKKOL TLP-4, NIKKOL TCP-5, NIKKOL TOP-0V, NIKKOL TDP-2, NIKKOL TDP-6, NIKKOL TDP-8 and NIKKOL TDP-10 (all produced by Nikko Chemicals Co., Ltd.).

As the carbon number of R in the compound represented by any of formulae (II), (III) and (IV) is larger, the lubricating effect is higher. A good lubricating effect is obtained when the carbon number is 12 or more. The carbon number is more preferably 18 or more, and in this case, a particularly good lubricating effect is obtained. Also, when an ink composition containing, as a main component, the compound represented by formula (II) having high adsorbability to the metal surface is used, it is most effective against deterioration of the writing feel with increase of the writing distance.

Specifically, a highest lubricating effect is obtained by using Phosphanol RL-210, Phosphanol RL-310, Phosphanol RB-410, Phosphanol RD-720, Phosphanol LB-400, or a compound having a structural formula similar thereto, as a mixture of the compound represented by formula (II) and the compound represented by formula (III); NIKKOL DOP-8NV as a mixture of the compounds represented by formula (III); or NIKKOL TOP-0V as the compound represented by formula (IV). However, other compounds can also raise the lubricating effect by, for example, increasing the amount added.

If the compound represented by any of formulae (II), (III) and (IV) is used in an amount of 20.0 wt % or more in total, the content of water or organic solvent in the ink is decreased, which cause insufficient solubility of solid contents such as dye and resin in the ink, and blur is readily generated. Accordingly, the amount used thereof is preferably less than 20.0 wt % per oil based ink.

The compound represented by any of formulae (II), (III) and (IV) may be also previously mixed with a neutralizer and after neutralizing the phosphoric acid group, added to the ink so as to prevent the compound from reacting with other components in the ink and causing a time-dependent change in the ink state. The neutralizer used here is an amine compound, an amide compound, an amino acid compound, a derivative thereof, or an amphoteric surfactant. Specific examples thereof include polyoxyethylene alkylamines such as AMIET 102, AMIET 105, AMIET 302, AMIET 308 and AMIET 320, fatty amines such as FARMIN CS, FARMIN 08D, FARMIN 20D, FARMIN 80, FARMIN 86T, FARMIN 0, FARMIN T and FARMIN (all produced by Kao Corp.), alkyl polyether amines such as NYMEEN L-201, NYMEEN L-202, NYMEEN L207, NYMEEN F-215, NYMEEN S-202, NYMEEN S-204, NYMEEN S-210, NYMEEN S-215, NYMEEN S-220, NYMEEN T2-206, NYMEEN T2-210, NYMEEN T2-230, NYMEEN T2-260, NYMEEN DT-203 and NYMEEN DT-208 (all produced by NOF Corp.), polyoxyethylene alkylamines such as NIKKOL TAMNOS-5, NIKKOL TAMNOS-10, NIKKOL TAMNOS-15, NIKKOL TAMNO-5 and NIKKOL TAMNO-15, polyoxyethylene fatty acid amides such as NIKKOL TAMDS-4, NIKKOL TAMDS-15 and NIKKOL TAMDO-5, amphoteric surfactants such as NIKKOL AM-301 and NIKKOL AM3130N (all produced by Nikko Chemicals Co., Ltd.), diethanolamine, triethanolamine, diisopropanolamine, triethylamine, dimethylaminoethanol, diethylaminoethanol, methyldiethanolamine, butyldiethanolamine, dibutylethanolamine, diethylisopropanolamine, butylisopropylamine, butylbenzylamine, and butoxypropylamine (all produced by Kanto Chemical Co., Inc.).

Also, in the ink of the present invention, when diethylene glycol monomethyl ether and/or diethylene glycol monoethyl ether are used as the liquid medium, a smoother writing feel is obtained by using a polyol-modified silicone oil and a phenol resin in combination. This is because the ball and the ball receiving seat portion covered with the compound represented by formula (I) and one kind of a compound or a mixture of two or more kinds of compounds selected from the any compounds of formulae (II), (III) and (IV) is further covered with a polyol-modified silicone oil and a phenol resin to have affinity for diethylene glycol monomethyl ether and/or diethylene glycol monoethyl ether as the solvent and be readily wetted with the ink. At this time, the weight ratio of the polyether-modified silicone oil to the phenol resin is preferably from 0.05 to 2.5.

Examples of the polyol-modified silicone oil include FZ-2110, FZ-2122, FZ-7006, FZ-2166, FZ-2164, FZ-2154, FZ-2191, FZ-7001, FZ-2120, FZ-2130, SF-8410, FZ-2101, SH8400, SH-8700, FZ-720, FZ-7002, FZ-2123, FZ-2104, FZ-77, FZ-2105, SH3748, FZ-2118, FZ-7604, FZ-2161, SH3771 and FZ-2162 produced by Dow Corning Toray Silicone Co., Ltd., KF-351A, KF-352A, KF-353, KF-354L, KF-355A, KF-615A, KF-945, KF-640, KF-642, KF-643, KF-6020, X-22-6191, X-22-4615, KF-6011, KF-6012, KF-6015 and KF-6017 produced by Shin-Etsu Chemical Co., Ltd., and SILWET L-77, TSF4440, TSF4441, TSF4445, TSF4446, TSF4450, TSF4452 and TSF4460 produced by GE Toshiba Silicones.

The polyol-modified silicone oil is used in an amount of 0.2 to 4.5 wt % based on the total amount of the ink. If the amount used is less than 0.2 wt %, the effect of wetting the ball surface is reduced, whereas if it is added in excess of 4.5 wt %, the surface tension of the ink is decreased and when the ballpoint pen is left standing with the pen tip down, the ink may leak out.

The phenol resin is used in combination with the polyol-modified silicone oil to facilitate wetting of the ball surface with the ink, and examples thereof include SUMILITERESIN PR-219, SUMILITERESIN PR-19788, SUMILITERESIN PR-50641, SUMILITERESIN PR-51530 and SUMILITERESIN PR-53053 produced by Sumitomo Bakelite Co., Ltd., TAMANOL 135, TAMANOL 340, TAMANOL 350, TAMANOL 352, TAMANOL 354, TAMANOL 361, TAMANOL 366, TAMANOL 380, TAMANOL 386, TAMANOL 392, TAMANOL 396, TAMANOL 406, TAMANOL 409, TAMANOL 410, TAMANOL 412, TAMANOL 414, TAMANOL 417, TAMANOL 418, TAMANOL 420, TAMANOL 423, TAMANOL 100S, TAMANOL 200 N, TAMANOL 1010R, TAMANOL 510, TAMANOL 521, TAMANOL 526, TAMANOL 586, TAMANOL 572S, TAMANOL 509, TAMANOL PA, TAMANOL 531, TAMANOL 758 and TAMANOL 759 produced by Arakawa Chemical Industries, Ltd., HARIPHENOL 145G, HARIPHENOL 512, HARIPHENOL 532, HARIPHENOL 561, HARIPHENOL 573, HARIPHENOL 582, HARIPHENOL 504, HARIPHENOL 565, HARIPHENOL P-102U, HARIPHENOL P-130, HARIPHENOL P-160, HARIPHENOL P-292, HARIPHENOL PN717, HARIPHENOL S-420, HARIPHENOL P-600, HARIPHENOL T3120, HARIPHENOL P-216, HARIPHENOL P-637, HARIPHENOL P-222 and HARIPHENOL P-622 produced by Harima Chemicals, Inc., and Hitanol 1133, Hitanol 1135, Hitanol 1140, Hitanol 1501, Hitanol 1002, Hitanol 2501, Hitanol 2100, Hitanol 2181, Hitanol 2181S, Hitanol 2181SL, Hitanol 2300N, Hitanol 2306N, Hitanol 2330N, Hitanol 2353N, Hitanol 2420, Hitanol 2422, Hitanol 2423A, Hitanol 2426B and Hitanol 643KN produced by Hitachi Chemical Co., Ltd.

The phenol resin is used in an amount of 0.5 to 5.0 wt % based on the total amount of the ink. If the amount used is less than 0.5 wt %, the resin is insufficient to form a film by sticking to the ball surface together with the ink and smooth rotation of the ball cannot be obtained, whereas if the phenol resin is added in excess of 5.0 wt %, the ink is liable to be dried and the handwriting may blur at the start of writing after leaving the pen tip to stand in air for a long time.

The viscosity of the ink affects softness of the writing feel. Therefore, an ink with a relatively low viscosity from about several mPa·s to 1,300 mPa·s is preferable. In the case of an ink having a shear-thinning viscosity profile, it is preferable that the ink is an ink whose viscosity in the vicinity of the shear rate of 3,000 [1/sec] produced by the estimated rotation of the ball during writing becomes from about several mPa·s to 500 mPa·s. However, in the case of an ink having almost no shear-thinning viscosity profile, wherein the shear-thinning viscosity index is 1.0 or close thereto, the viscosity when standing still and the viscosity during writing are almost the same and therefore, the viscosity above becomes from about several mPa·s to 500 mPa·s.

The viscosity of the ink can be adjusted by appropriately selecting a thickener to have the desired viscosity. Specific examples of the thickener include water-soluble synthetic polymers, for example, celluloses such as polyvinylpyrrolidone, polyvinyl alcohol, carboxymethyl cellulose, carboxyethyl cellulose, HPC-SL, HPC-L, HPC-M, HPC-H (all produced by Nippon Soda Co., Ltd.), Avicel PH-101, Avicel PH-102, Avicel PH-301, Avicel PH-M06, Avicel TG-101 (all produced by Asahi Chemical Industry Co., Ltd.), polysaccharides such as pullulan (produced by Hayashibara Biochemical Laboratories, Inc.), and polymerized and crosslinked products of N-vinylacetamide, such as GX-205 and NA-010 (both produced by Showa Denko K.K.); and inorganic clay minerals such as Smecton SA (smectite, produced by Kunimine Industries Co., Ltd.), Kunipia F, Kunipia G (montmorillonite, Kunimine Industries Co., Ltd.), Bengel HV, Bengel FW, Bengel 15, Bengel 23 (bentonite, produced by Hojun Co., Ltd.), Esben, Esben C, Esben W and Esben N400 (quaternary ammonium cation-modified montmorillonite, produced by Hojun Co., Ltd.)

One of these may be used alone, or two or more thereof may be used in combination.

As the lubricant, a surfactant or a phosphoric acid ester-based lubricant can be used.

The phosphoric acid ester-based lubricant includes, for example, polyoxyethylene alkyl ether phosphoric acid monoesters, diesters and triesters, and examples thereof include those where the addition molar number of ethylene oxide is from 0 to 20 and the carbon number of the alkyl group of the terminal alkyl ether is from 9 to 18.

Examples of the lubricant used in combination other than the phosphoric acid ester-based lubricant include polyoxyethylene alkyl ether, glycerin fatty acid ester, polyglycerin fatty acid ester, sorbitan fatty acid ester, polyoxyethylene sorbitol fatty acid ester, polyoxyethylene castor oil, polyoxyethylene hardened castor oil, polyoxyethylene fatty acid ester, polyoxyethylene polyoxypropylene alkyl ether, polyoxyethylene alkylamine and N-acylamino acid.

One of these may be used, or a plurality thereof may be mixed and used. The amount of the lubricant used is preferably on the order of 0.1 to 5 wt %.

As for the surfactant, in order to improve the pigment dispersibility, an anionic, cationic, nonionic or amphoteric surfactant can be secondarily used. Specific examples thereof include anionic, nonionic, cationic surfactants such as higher fatty acid, higher alcohol sulfuric ester salts, fatty acid sulfuric ester salts, alkylallylsulfonic acids, phosphoric acid esters, polyoxyalkylene alkyl ethers, polyoxyalkylene alkylphenyl ethers and sorbitan fatty acid esters.

A polymer resin may be also used for the same purpose, and examples thereof include resins and oligomers for pigment dispersion, such as polyvinylbutyral resin, polyvinylpyrrolidone resin, polyacrylic acid ester resin, polymethacrylic acid ester resin and styrene-acrylic acid copolymer resin.

One of these resins may be used alone, or two or more thereof may be used in combination.

Also, a method commonly used for general purposes may be used for dispersing the pigment. For example, a pigment, a solvent and a dispersant are mixed and after uniformly stirring the mixture by a propeller stirrer, the pigment is dispersed by a disperser. The disperser such as roll mill, ball mill, sand mill, bead mill and homogenizer is appropriately selected according to the amount of water or organic solvent in the ink or the concentration of pigment.

In addition, conventionally known additives for ink, for example, a dispersant such as natural resin, synthetic resin and anionic, cationic, nonionic or amphoteric surfactant, a rust inhibitor such as benzotriazole, metal salt type and phosphoric acid ester-based compound, an antiseptic such as isothiazolone and oxazolidine-based compound, a defoaming agent such as silicon type, mineral oil and fluorine-based compound, a wetting agent such as glycerin, sorbitan type, polysaccharides, urea, ethylene urea and their derivatives, a leveling property-imparting agent such as acetylene glycol, acetylene alcohol and silicon-containing surfactant, an antifreeze agent, and a ketone resin as a resin for fixing, may be also used in combination, if desired.

For the production of ink, the pigment dispersed above and other components, for example, a viscosity adjusting resin, a solvent, a lubricant and water-soluble polysaccharides, are blended and uniformly dissolved/mixed by a stirring machine such as homomixer until the mixture becomes uniform, whereby the ink is obtained. There is no problem that depending on the case, the mixed ink may be further dispersed by a disperser or the obtained ink may be subjected to filtration or centrifugal separator to remove coarse particles or insoluble components.

A preferred ballpoint pen and ballpoint pen tip using such an ink are described below.

The ball as the writing member is formed of a super-hard alloy such as tungsten carbide, or a ceramic sintered body such as silicon carbide.

The ball is, for example, a super hard alloy containing from 75 to 95 wt % of tungsten carbide and from 5 to 25 wt % of a binder metal such as cobalt, nickel and chromium. A super-hard alloy containing from 87.5 to 95.5 wt % of tungsten carbide and from 4.5 to 12.5 wt % of a binder metal such as cobalt, nickel and chromium, where the ball surface is subjected to a physical and/or chemical polishing treatment to remove fine binder metal and form fine crevices of approximately from 0.2 to 2.0 um on the ball surface is preferable.

Particularly, in the case of a ballpoint pen using an ink employing a phosphoric acid ester-based lubricant, the above-described super hard alloy is preferred in view of adsorbability. Furthermore, when the ink has a viscosity of 200 to 800 mPa·s and a shear-thinning viscosity index of 0.9 to 1.0, the ink readily permeates the crevices on the surface and it is easy to secure the state of the ball surface being wetted with the ink. Therefore, the ink is likely to intervene between the ball and the ball transferred part, which makes the ink to easily work as a lubricant during rotation. Also, the ball surface may be covered with titanium oxide.

The ball holder holding the ball has an inwardly protruding part in the middle of a through-hole defining the ink pathway, which is the ball retreat-regulating part, and a caulked part in the front-end opening, which is a barrier to the escape of ball and has a diameter smaller than that of the ball.

The inwardly protruding part is nearly evenly divided by a center hole and penetrating radial grooves and disposed in a circumferentially. The radial groove is a channel for the inflow of ink into outside of the ball and considering only the flow rate of ink, it is preferable to make a large number of wide grooves. However, if a large number of wide radial grooves are made, the area of the ball receiving seat part is decreased. Therefore, the radial groove is adjusted to an appropriate number of grooves and an appropriate width. It is preferable that the number of radial grooves is 3 or more, because since it makes easy to evenly supply the ink to around the ball.

In the case where the ball holder is formed from a metal-made pipe material, the pipe side wall is dented to the inside from the outside by press working using a punch to form a plurality of inwardly protruding parts in a circumferentially, whereby radial grooves can be obtained. In the case of obtaining radial grooves by the process, a smaller-diameter pipe for holding a ball having a small diameter of, for example, 0.3 mm requires more accurate process and when the number of radial grooves is increased, the width of individual radial grooves or the opening area is reduced. Therefore, it is preferable that the number of radial grooves is 3 or 4.

The caulked part formed at the front end of the ball holder to have a diameter smaller than that of the ball is created by, after inserting the ball, externally pressing a rotating roll member or the like against the front end of the ball holder to inwardly bend the front end of the ball holder. At the formation of the caulked part, the inner surface of the ball holder is pressed against the ball, whereby a ball transferred part can be formed on the inner surface of the ball holder. In this connection, separately from the formation of the caulked part, a pressing force may be also externally applied to the inner surface of the ball holder, thereby pressing the ball to the inner surface of the ball holder and forming the ball transferred part.

In either method, when the pressing range is widened, the area of the ball transferred part can be increased. Specifically, a ball transferred part having a large area can be formed by the method that the position of the ball is set to a low position with respect to the front end of the ball holder (in other words, set to a position on the rear end side of the ball holder); the pressing angle of the caulking tool (the angle between the axis of the pen and the pressing surface of the pressing tool) is made acute; or the load on pressing is increased.

After loading the ball in the ball holder and forming a barrier to the escape of ball, the ball is pressed to the inwardly protruding part to deform the inwardly protruding part, to form a ball receiving seat part as a part of the ball transferred part. By firmly pressing the ball, the deformation amount (the depth) in the inwardly protruding part can be increased. As a result, the ball transferred part can be widened. A large pressing force of the ball leads to an increase in the back and forth movable distance of the ball. Therefore, the maximum opening amount of the ink discharge port formed in the front end of the ball holder can be set by adjusting the pressing force.

The ball transferred part created in each of the front end of the ball holder and the inwardly protruding part is formed through plastic process by firmly pressing the ball to the inner surface of the ball holder or pressing a jig having the same radius of curvature as that of the ball to the inner surface of the ball holder. At the formation of the ball transferred part, the ball or jig may be rotated to make smooth the concave shape as the ball transferred part which is formed in the inner surface of the ball holder.

Additionally, in the deformation process of a metal material by pressing, a rebound phenomenon called spring back is generally generated. In the spring back, the deformation amount differs in many cases between the contact boundary portion and the middle of the pressing member. Therefore, the pressing amount is designed by taking the spring-back amount into consideration. Such a difference in the spring-back amount according to the portion comes out as a difference in the radius of curvature of the concave portion. The radius of curvature of the concave part as the ball transferred part is not completely the same as the radius of curvature of the ball. Therefore, a gap allowing for intervention of ink between the ball transferred part and the ball is formed, which is advantageous in obtaining the lubricating effect of the ink. However, an excessively large difference in the radius of curvature rather becomes a cause of inhibiting the rotation of the ball. Therefore, the radius of curvature of the ball transferred part is preferably from 101 to 104% based on the radius of curvature of the ball.

A coil spring may be also inserted in the ink pathway of the ball holder to forwardly bias the ball at the front end directly or through a member. The backward movement of the coil spring is regulated by caulking the rear end of the ball holder or forming a step on an ink tank or a connection member to the ink tank. Also, by making the coil spring end portion abutting the ball to have a straight shape and by inserting, the coil spring end portion is passed through the ink pathway which is narrowed by the inwardly protruding part, by which a pressing force can be unfailingly applied to the ball. By biasing forwardly the ball by the coil spring, the ball can circumferentially abuts the ball holder during non-use of the ballpoint pen and unnecessary leakage of the ink can be inhibited.

The material of the ball holder may be an alloy such as stainless steel and nickel silver, or an abrasion-resistant resin material such as polyoxymethylene. In view of durability, adsorbability with an ink using a phosphoric acid-based lubricant, or the like, a ball holder is preferably made of a stainless steel that is an iron alloy.

The ball holder is connected to an ink storage member directly or through a connection member.

In the ballpoint pen of the present invention, after filling the ink in the ink storage member, a back-flow inhibitor can be used in the rear end part of the ink for the purpose of preventing the backflow or drying of ink. For the backflow inhibitor, a sparingly volatile hydrocarbon such as polybutene gelled with a gelling agent, or a silicone oil gelled with a hydrophilic or hydrophobic silica or the like, can be used. In particular, a silicone oil thickened with silica is preferable in view of reactivity, ink followability and the like.

Examples

Examples wherein a ballpoint pen according to the present invention was actually prepared and evaluated are described below. The following Inks A to W were prepared. Incidentally, in each ink, when "parts" is simply used, it indicates "parts by weight". Inks A to Q are subjects of ink the present invention, and Inks R to W are not subjects of ink of the present invention.

(Ink A)
Printex 35 (carbon black, produced by Degussa-Huels Japan): 6.0 parts
VALIFAST VIOLET 1730 (oil dye, produced by Orient Chemical Industries): 16.3 parts
SPILON RED C-GH (oil dye, produced by Hodogaya Chemical Co., Ltd.): 1.0 part
OIL BLUE 613 (oil dye, produced by Orient Chemical Industries): 1.0 part
SPILON YELLOW C-GNH (oil dye, produced by Hodogaya Chemical Co., Ltd.): 1.1 parts
Diethylene glycol monomethyl ether: 50.0 parts
Ethylene glycol monoisopropyl ether: 17.2 parts
S-LEC BL-1 (polyvinylbutyral, produced by Sekisui Chemical Co., Ltd.): 1.6 parts
S-LEC BH-3 (polyvinylbutyral, produced by Sekisui Chemical Co., Ltd.): 0.3 parts
NIKKOL HCO-10 (a compound represented by formula (I), produced by Nikko Chemicals Co., Ltd.): 1.0 part
Phosphanol LB400 (a mixture of a compound represented by formula (II) and a compound represented by formula (III), produced by Toho Chemical Industry Co., Ltd.): 1.5 parts
NIKKOL TOP-0V (a compound represented by formula (IV), produced by Toho Chemical Industry Co., Ltd.): 1.0 part
NYMEEN L201 (PEG-1 laurylamine, produced by NOF Corp.): 1.0 part
UNIOL D2000 (polyoxypropylene glycol, produced by NOF Corp.): 1.0 part Among the components above, the entire amount of diethylene glycol monomethyl ether and amount of ethylene glycol monoisopropyl ether and the entire amount of S-LEC BL-1 were stirred, mixed and dissolved at 70° C., and the resulting solution was allowed to be cooled to be room temperature. The entire amount of Printex 35 was added thereto, and the mixture was subjected to 10 passes through Dyno-Mill (bead mill, manufactured by Shinmaru Enterprises Corp.) using zirconia beads of 0.3 mm in diameter to obtain a black paste.

The remaining materials each in its entire amount were added to the paste, and these were stirred at 70° C. for 3 hours to obtain an oil-based black ink for ballpoint pen.

(Ink B)
SPILON VIOLET C-RH (oil dye, produced by Hodogaya Chemical Co., Ltd.): 13.0 parts
SPILON YELLOW C-GNH (oil dye, produced by Hodogaya Chemical Co., Ltd.): 7.0 parts
Diethylene glycol monomethyl ether: 27.0 parts
Ethylene glycol mono-normal-propyl ether: 16.5 parts
Benzyl glycol: 5.0 parts
HIRACK 110H (ketone resin, produced by Hitachi Chemical Co., Ltd.): 6.0 parts
PEMULEN TR-2 (produced by B.F. Goodrich, U.S.A.): 1.5 parts
NIKKOL HCO-5 (a compound represented by formula (I), produced by Nikko Chemicals Co., Ltd.): 2.0 parts
NONION C-2300 (a compound represented by formula (I), produced by NOF Corp.): 1.0 part
Phosphanol LP710 (a mixture of a compound represented by formula (II) and a compound represented by formula (III), produced by Toho Chemical Industry Co., Ltd.): 20.0 parts
AMIET 105 (POE coconut amine, produced by Kao Corp.): 1.0 part The components above were stirred and uniformly dissolved at 70° C. to obtain an oil-based black ink for ballpoint pen.

(Ink C)
FUJI Red 8800 (C.I. Pigment Red 254, produced by Fuji Pigment Co., Ltd.): 3.0 parts
SPILON RED C-GH (oil dye, produced by Hodogaya Chemical Co., Ltd.): 17.6 parts
SPILON RED C-BH (oil dye, produced by Hodogaya Chemical Co., Ltd.): 0.8 parts
SPILON YELLOW C-GNH: 3.8 parts
Diethylene glycol monomethyl ether: 18.0 parts
Ethylene glycol monoisopropyl ether: 11.0 parts
Phenyl cellosolve: 32.1 parts
S-LEC BL-1: 1.6 parts
NIKKOL BL-9EX: 2.0 parts
EMALEX HC-20 (a compound represented by formula (I), produced by Nihon Emulsion Co., Ltd.): 10.0 parts
PLYSURF A208 (a mixture of a compound represented by formula (II) and a compound represented by formula (III), produced by Dai-Ichi Kogyo Seiyaku Co., Ltd.): 0.1 parts Among the components above, the entire amount of diethylene glycol monomethyl ether, ethylene glycol monoisopropyl ether, and Phenyl cellosolve and the entire amount of S-LEC BL-1 were stirred, mixed and dissolved at 70° C., and the resulting solution was allowed to cool to room temperature. The entire amount of FUJI RED 8800 was added thereto, and the mixture was subjected to 10 passes through Dyno-Mill (bead mill, manufactured by Shinmaru Enterprises Corp.) using zirconia beads of 0.3 mm in diameter to obtain a red paste.

The remaining materials each in its entire amount were added to the paste, and these were stirred at 70° C. for 3 hours to obtain an oil-based red ink for ballpoint pen.

(Ink D)
VALIFAST BLUE 1603 (salt-forming dye of C.I. DIRECT BLUE 86 and C.I. BASIC BLUE 7, produced by Orient Chemical Industries): 20.0 parts SPILON RED C-GH (oil dye, produced by Hodogaya Chemical Co., Ltd.): 3.0 parts
Phenyl cellosolve: 41.4 parts
Diethylene glycol monomethyl ether: 23.3 parts
Benzyl alcohol: 10.2 parts
S-LEC BH-3: 1.0 part
UNIOX HC-50MSU (a compound represented by formula (I), produced by NOF Corp.): 0.1 parts
NIKKOL TOP-0V (a compound represented by formula (IV), produced by Nikko Chemicals Co., Ltd.): 1.0 part The components above were stirred and uniformly dissolved at 70° C. to obtain an oil-based blue ink for ballpoint pen.
(Ink E)

An oil-based blue ink was obtained in the same manner as Ink D except for decreasing the amount of UNIOX HC-50MSU to 0.008 parts and substituting the decreased amount to the amount of diethylene glycol monomethyl ether.
(Ink F)

Printex 35 (carbon black, produced by Degussa-Huels Japan): 6.0 parts
SPILON VIOLET C-RH (oil dye, produced by Hodogaya Chemical Co., Ltd.): 16.3 parts
VALIFAST YELLOW C-GNH (oil dye, produced by Orient Chemical Industries): 3.1 parts
Diethylene glycol monomethyl ether: 48.1 parts
Benzy glycol: 17.25 parts
S-LEC BL-1 (polyvinylbutyral, produced by Sekisui Chemical Co., Ltd.): 1.6 parts
S-LEC BH-3 (polyvinylbutyral, produced by Sekisui Chemical Co., Ltd.): 0.4 parts
NIKKOL HCO-10: 5.0 parts
Phosphanol LB400: 1.0 part
NYMEEN L201 (PEG-1 laurylamine, produced by NOF Corp.): 1.0 part Hitanol 1501 (alkylphenol resin, produced by Hitachi Chemical Co., Ltd.): 0.5 parts
FZ-7002 (polyether-modified silicone oil, produced by Dow Corning Toray Silicone Co., Ltd.): 0.25 parts Among the components above, the entire amount of diethylene glycol monomethyl ether and the entire amount of S-LEC BL-1 were stirred, mixed and dissolved at 70° C., and the resulting solution was allowed to be cooled to be room temperature. The entire amount of Printex 35 was added thereto, and the mixture was subjected to 10 passes through Dyno-Mill (bead mill, manufactured by Shinmaru Enterprises Corp.) using zirconia beads of 0.3 mm in diameter to obtain a black paste.

The remaining materials each in its entire amount were added to the paste, and these were stirred at 70° C. for 3 hours to obtain an oil-based black ink for ballpoint pen.
(Ink G)

An oil-based black ink for ballpoint pen was obtained in the same manner as Ink F except for increasing the amount added of FZ-7002 to 3.0 parts and accordingly decreasing the amount of diethylene glycol monomethyl ether.
(Ink H)

SPILON VIOLET C-RH: 13.0 parts
SPILON YELLOW C-GNH: 7.0 parts
Diethylene glycol monoethyl ether: 64.2 parts
Phenyl cellosolve: 10.0 parts
HARIPHENOL 145G (phenol resin, produced by Harima Chemicals, Inc.): 2.0 parts
Polyvinylpyrrolidone K-90 (thickener, produced by Nippon Shokubai Co., Ltd.): 2.5 parts
UNIOX HC-50MSU: 0.1 parts
NIKKOL TOP-0V: 1.0 part
FZ2120 (polyether-modified silicone oil, produced by Dow Corning Toray Silicone Co., Ltd.): 0.2 parts The components above were stirred and uniformly dissolved at 70° C. to obtain an oil-based black ink for ballpoint pen.
(Ink I)

NOVOPERM RED F3RK70 (C.I. Pigment Red 170, produced by Clariant Japan K.K.): 3.0 parts
SPILON RED C-GH (oil dye, produced by Hodogaya Chemical Co., Ltd.): 14.6 parts
SPILON RED C-BH (oil dye, produced by Hodogaya Chemical Co., Ltd.): 0.8 parts
SPILON YELLOW C-GNH: 3.4 parts
Diethylene glycol monoisobutyl ether: 27.0 parts
Ethylene glycol mono-normal-propyl ether: 16.5 parts
Propylene glycol monomethyl ether: 12.45 parts
TAMANOL PA (phenol resin, produced by Arakawa Chemical Industries, Ltd.): 5.0 parts
S-LEC BL-1: 6.0 parts
NIKKOL HCO-5: 2.0 parts
NONION C-2300: 1.0 part
Phosphanol LP710: 5.0 parts
AMIET 105 (POE coconut amine, produced by Kao Corp.): 1.0 part
KF353 (polyether-modified silicone oil, produced by Shin-Etsu Chemical Co., Ltd.): 0.25 parts Out of the components above, the entire amount of diethylene glycol monoisobutyl ether, ethylene glycol mono-normal-propyl ether and propylene glycol monomethyl ether and the entire amount of S-LEC BL-1 were stirred, mixed and dissolved at 70° C., and the resulting solution was allowed to be cooled to be room temperature. The entire amount of NOVOPERM RED F3RK70 was added thereto, and the mixture was subjected to 10 passes through Dyno-Mill using zirconia beads of 0.3 mm in diameter to obtain a red paste.

The remaining materials each in its entire amount were added to the paste, and these were stirred at 70° C. for 3 hours to obtain an oil-based red ink for ballpoint pen.
(Ink J)

An oil-based red ink for ballpoint pen was obtained in the same manner as Ink I except for increasing the amount added of KF353 to 1.0 part and accordingly decreasing the amount of ethylene glycol monoisopropyl ether.
(Ink K)

VALIFAST BLUE 1603 (salt-forming dye of C.I. DIRECT BLUE 86 and C.I. BASIC BLUE 7, produced by Orient Chemical Industries): 20.0 parts
SPILON RED C-GH: 3.0 parts
Ethylene glycol monoisopropyl ether: 7.4 parts
Diethylene glycol monomethyl ether: 57.28 parts
Benzyl glycol: 5.2 parts
S-LEC BH-3: 1.4 parts
UNIOX HC-50MSU: 0.1 parts
NIKKOL TOP-0V: 1.0 part
KF353 (polyether-modified silicone oil, produced by Shin-Etsu Chemical Co., Ltd.): 0.22 parts
SUMILITERESIN PR-19788 (phenol resin, produced by Sumitomo Bakelite Co., Ltd.): 4.4 parts The components above were stirred and uniformly dissolved at 70° C. to obtain an oil-based blue ink for ballpoint pen.
(Ink L)

An oil-based black ink for ballpoint pen was obtained in the same manner as Ink F except for increasing the amount of Hitanol 1501 to 5.5 parts and accordingly decreasing the amount of diethylene glycol monomethyl ether.

(Ink M)

An oil-based black ink for ballpoint pen was obtained in the same manner as Ink H except for increasing the amount of FZ2120 to 5.0 parts and accordingly decreasing the amount of diethylene glycol monoethyl ether.

(Ink N)

An oil-based black ink for ballpoint pen was obtained in the same manner as Ink H except for replacing HARIPHENOL 145G by MALKYD #33 (maleic acid resin, produced by Arakawa Chemical Industries, Ltd.).

(Ink O)

An oil-based red ink for ballpoint pen was obtained in the same manner as Ink I except for replacing KF353 by NIKKOL BO-7V (polyoxyethylene(7)oleyl ether, produced by Nikko Chemicals Co., Ltd.).

(Ink P)

Printex 35 (carbon black, produced by Degussa-Huels Japan): 6.0 parts VALIFAST VIOLET 1730 (oil dye, produced by Orient Chemical Industries): 16.3 parts VALIFAST YELLOW C-GNH (oil dye, produced by Orient Chemical Industries): 3.1 parts Diethylene glycol monomethyl ether: 49.89 parts Ethylene glycol monoisopropyl ether: 17.2 parts S-LEC BL-1 (polyvinylbutyral, produced by Sekisui Chemical Co., Ltd.): 1.6 parts S-LEC BH-3 (polyvinylbutyral, produced by Sekisui Chemical Co., Ltd.): 0.3 parts NIKKOL HCO-10:1.0 parts NIKKOL DDP-8 (a compound represented by formula (III), produced by Nikko Chemicals Co., Ltd.): 1.2 parts NIKKOL TDP-8 (a compound represented by formula (IV), produced by Nikko Chemicals Co., Ltd.): 1.4 parts NYMEEN L201 (PEG-1 laurylamine, produced by NOF Corp.): 1.0 part UNIOL D2000 (polyoxypropylene glycol, produced by NOF Corp.): 1.0 part AKP-20 (alumina, particle diameter: 0.5 μm, produced by Sumitomo Chemical Co., Ltd.): 0.01 parts Among the components above, the entire amount of diethylene glycol monomethyl ether, ethylene glycol monoisopropyl ether and the entire amount of S-LEC BL-1 were stirred, mixed and dissolved at 70° C., and the resulting solution was allowed to cool to room temperature. The entire amount of Printex 35 was added thereto, and the mixture was subjected to 10 passes through Dyno-Mill (bead mill, manufactured by Shinmaru Enterprises Corp.) using zirconia beads of 0.3 mm in diameter to obtain a black paste.

The remaining materials each in its entire amount were added to the paste, and these were stirred at 70° C. for 3 hours to obtain an oil-based black ink for ballpoint pen.

(Ink Q)

NOVOPERM RED F3RK70 (C.I. Pigment Red 170, produced by Clariant Japan K.K.): 3.0 parts SPILON RED C-GH (oil dye, produced by Hodogaya Chemical Co., Ltd.): 17.6 parts SPILON RED C-BH (oil dye, produced by Hodogaya Chemical Co., Ltd.): 0.8 parts SPILON YELLOW C-GNH: 3.8 parts Diethylene glycol monoisobutyl ether: 16.6 parts Ethylene glycol mono-normal-propyl ether: 40.5 parts Propylene glycol monomethyl ether: 3.0 parts S-LEC BL-1: 1.6 parts Joncryl J682 (styrene acrylic resin, produced by BASF Japan): 3.0 parts EMALEX HC-20 (a compound represented by Chem. 1, produced by Nihon Emulsion Co., Ltd.): 9.6 parts NIKKOL DDP-6 (a compound represented by Chem. 3, produced by Nikko Chemicals Co., Ltd.): 0.5 parts Among the components above, the entire amount of diethylene glycol monoisobutyl ether, ethylene glycol mono-normal-propyl ether and propylene glycol monomethyl ether and the entire amount of S-LEC BL-1 were stirred, mixed and dissolved at 70° C., and the resulting solution was allowed to be cooled to be room temperature. The entire amount of NOVOPERM RED F3RK70 was added thereto, and the mixture was subjected to 10 passes through Dyno-Mill (bead mill, manufactured by Shinmaru Enterprises Corp.) using zirconia beads of 0.3 mm in diameter to obtain a red paste.

The remaining materials each in its entire amount were added to the paste, and these were stirred at 70° C. for 3 hours to obtain an oil-based red ink for ballpoint pen.

Inks R to W described below are not subjects of ink of the present invention which are prepared for examination by comparison with Inks A to Q which are subjects of ink of the present invention.

(Ink R)

An oil-based black ink was obtained in the same manner as Ink A except for excluding NIKKOL HCO-10 and accordingly replacing the amount by ethylene glycol monoisopropyl ether.

(Ink S)

An oil-based black ink was obtained in the same manner as Ink A except for excluding NIKKOL HCO-10 and adding NIKKOL GO-460V (polyoxyethylene sorbitol tetraoleate, produced by Nikko Chemicals Co., Ltd.) alternatively.

(Ink T)

An oil-based red ink was obtained in the same manner as Ink C except for excluding EMALEX HC-20 and adding NIKKOL TMGS-5V (polyoxyethylene glyceryl monostearate, produced by Nikko Chemicals Co., Ltd.) alternatively.

(Ink U)

VALIFAST BLUE 1603 (salt-forming dye of C.I. DIRECT BLUE 86 and C.I. BASIC BLUE 7, produced by Orient Chemical Industries): 20.0 parts SPILON RED C-GH (oil dye, produced by Hodogaya Chemical Co., Ltd.): 3.0 parts Phenyl cellosolve: 57.7 parts Benzyl alcohol: 9.3 parts HIRACK 110H, 7.0 parts Nomcort HK-P (polyglyceryl-10 behenate/eicosadioate produced by The Nisshin OilliO Group, Ltd.): 1.0 part EXTRA OLEIN 80: 2.0 parts The components above were stirred and uniformly dissolved at 70° C. to obtain an oil-based blue ink for ballpoint pen.

(Ink V)

An oil-based black ink for ballpoint pen was obtained in the same manner as Ink H except for excluding NIKKOL TOP-0V and accordingly replacing the amount by diethylene glycol monoethyl ether.

(Ink W)

An oil-based black ink for ballpoint pen was obtained in the same manner as Ink H except for excluding NIKKOL TOP-0V and adding EXTRA OLEIN 80 alternatively.

The structure of the ballpoint pen tip used for evaluation is described below.

FIG. 1 shows one example of a ballpoint pen comprising a ball holder 2 rollably holding a ball 1 as a writing member in the state of the ball being partially projected from the front-end opening 2*a*, and an ink storage part 3 joined to the ball holder 2.

The ballpoint pen tip shown in FIG. 1 comprises a ball 1, a ball holder 2 and the later-described coil spring 6. The small size part at the rear end of the ballpoint pen tip is fitted into the front end of the pipe-shaped ink storage part 3 obtained by extrusion molding of a polypropylene resin or the like, and the ballpoint pen tip is fixed in the ink storage part 3.

In the ink storage 3, an oil-based ink 4 is stored, and a backflow inhibitor composition 5 which is a high-viscosity fluid incompatible with the ink is disposed in contact with the interface at the rear end of the oil-based ink 4. Particularly, when a low-viscosity ink is used, it is effective to dispose a backflow inhibitor composition for preventing the ink from moving backward.

Figure 2:
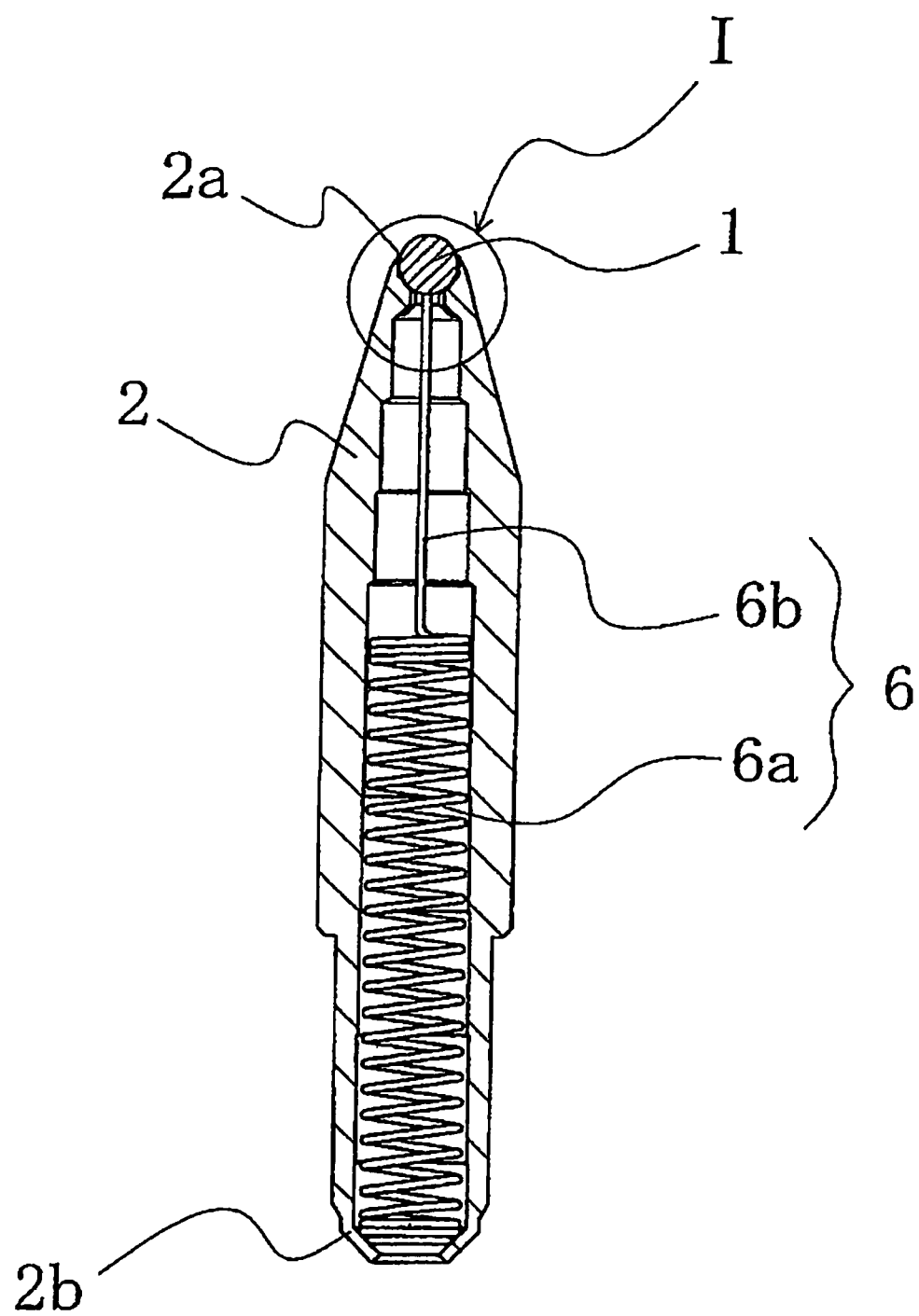
FIG. 2 is a longitudinal sectional figure showing one example of the ballpoint pen tip of the present invention.

As seen in FIG. 2 showing an enlarged view of the ballpoint pen tip, a coil spring 6 for preventing ink leakage is located in the inside of the ball holder 2. The coil spring 6 is fixed in the state of biasing the rear end of the ball 1 by applying a caulking process to reduce the diameter of the rear-end opening 2b of the ball holder 2 under compression which is carried out after insertion into the ball holder 2. The coil spring 6 comprises an extensible coil part 6a and a straight end part 6b, and the straight end part 6B passes through the through-hole defining the ink pathway of the ball holder 2 and directly pushes the rear end of the ball, by which the ball 1 is circumferentially abutted to the inner edge of the front-end opening 2a of the ball holder 2.

Figure 3:
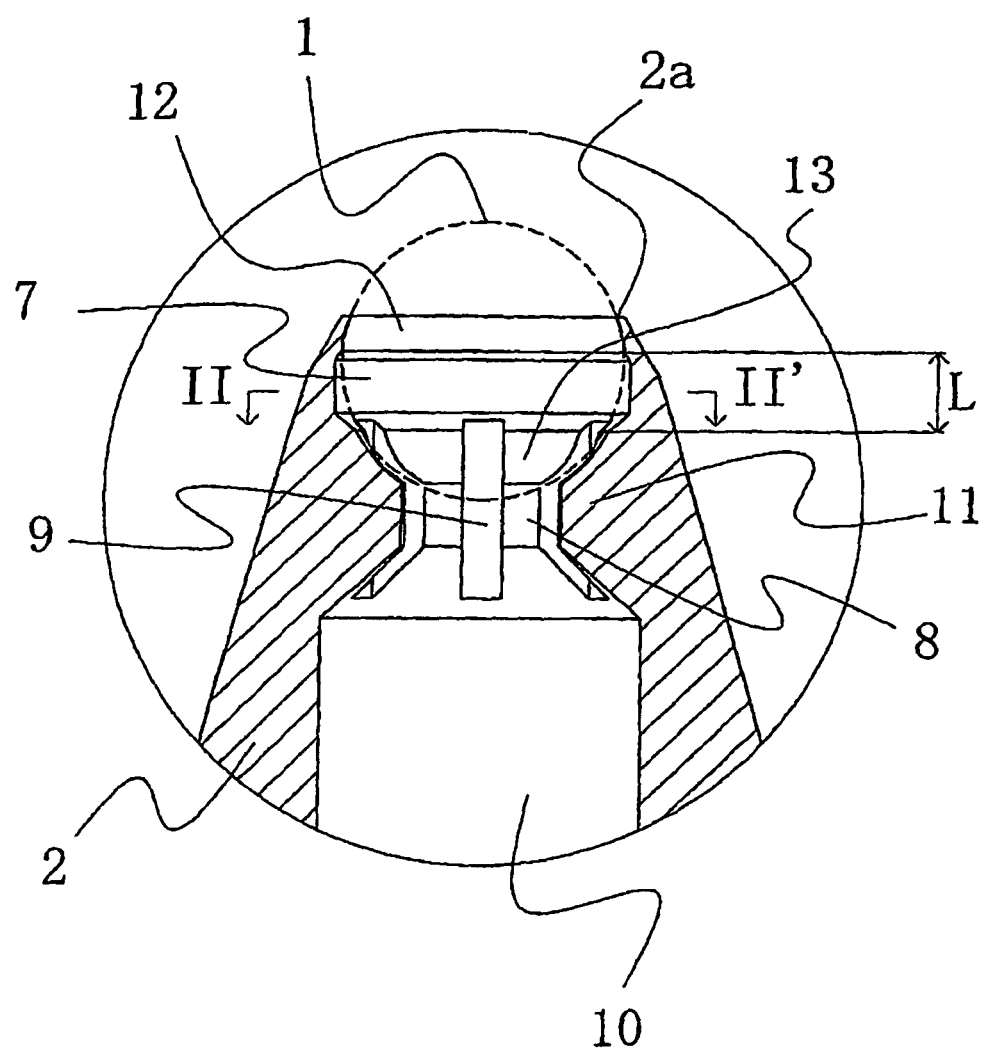
FIG. 3 is an enlarged figure of the part I in FIG. 2.

FIG. 3 shows an enlarged view of the part I in FIG. 2. For convenience of description, the coil spring 6 is not shown, and the ball 1 is shown by a dashed line.

The ball holder 2 has, as the penetrating ink pathway, a ball holding room 7, a center hole 8, a radial groove 9 and a rear hole 10 in order from the front end side to the rear end side.

A plurality of inwardly protruding parts 11 (in this example, 6 inwardly protruding parts) are formed between the ball holding room 7 and the rear hole 10, and the space between adjacent inwardly protruding parts 11 defines a radial groove 9. The radial groove 9 is opened to face the ball surface of the ball holding room 7 and even when the ball 1 moves to the rear end, the ink can be supplied to the portion unclogged with the ball 1.

In the front end portion of the ball holder 2, after loading the ball 1, an opening having a diameter smaller than the diameter of the ball 1 is formed by applying plastic deformation for inwardly bending the front end portion of the ball holder 2. Specifically, a caulking process is applied by obliquely pressing a rotating roll member or the like against the outer side of the front end portion of the ball holder 2 to reduce the diameter of the front end portion of the ball holder 2.

During the caulking process, the inner side of the ball holder 2, namely, the inner surface on the front end side of the ball holding room 7, is pressed against the ball 1, whereby a front-end ball transferred part 12 in which the surface of the ball 1 is transferred to the part is formed in a belt form.

After forming a barrier to the escape of ball 1 by the caulking process above, an impact force is imparted to the ball 1 by means of a hammer tool to press the ball 1 to the inwardly protruding part 11 as a portion for regulating the rearward movement of the ball 1. By the process, the inwardly protruding part 11 in the portion abutting the ball 1 is deformed into the ball 1 shape to form a curved ball receiving seat part 13 as a ball transferred part in which the ball 1 surface is transferred.

In the ballpoint pen tip of this example, the front-end ball transferred part 12 and the ball receiving seat part 13 are a ball transferred part. The total area of the front-end ball transferred part 12 and the ball receiving seat part 13 is preferably from 22 to 31% of the surface area of the ball 1.

Namely, in the case of using a ball of 0.7 mm, the total area of the ball transferred part is set to be from 0.34 to 0.48 mm$^2$.

The front-end ball transferred part 12 as a part of the ball transferred part may be formed as a belt-like portion from the front end of the opening of the ball holder 2 or may be also formed from a portion slightly back of the front end, for example, back by about 3% of the ball diameter, by adjusting the position or angle of the caulking process above. In this case, a small gap is formed between the ball 1 in the state of being forwardly biased by the coil spring 6 and the front-end opening 2a of the ball holder 2. Among the ink adsorbed to the ball, the gap is effective in allowing the ink uncoated on paper surface to be again recovered in the ball holder 2 and prevents a phenomenon that the ink runs on the outer side of the ball holder 2. Also, when a coating film capable of repelling the ink, such as fluorine compound, is formed on the outer surface of the ball holder 2, wetting of the outer side of the ball holder 2 with ink can be inhibited and the ink can be prevented from running on. In addition, when such a component capable of repelling the ink is applied also to the inner surface of the ball holder 2, extensive wetting with the ink is restricted and ink leakage from the front-end opening in a resting state can be inhibited.

The end point in the back of the front-end ball transferred part 12 is preferably located at the rear as much as possible for gaining the area of the ball transferred part. However, since the ball transferred part works out to a portion proximate to the ball 1, the ink pathway is narrowed.

Figure 4:
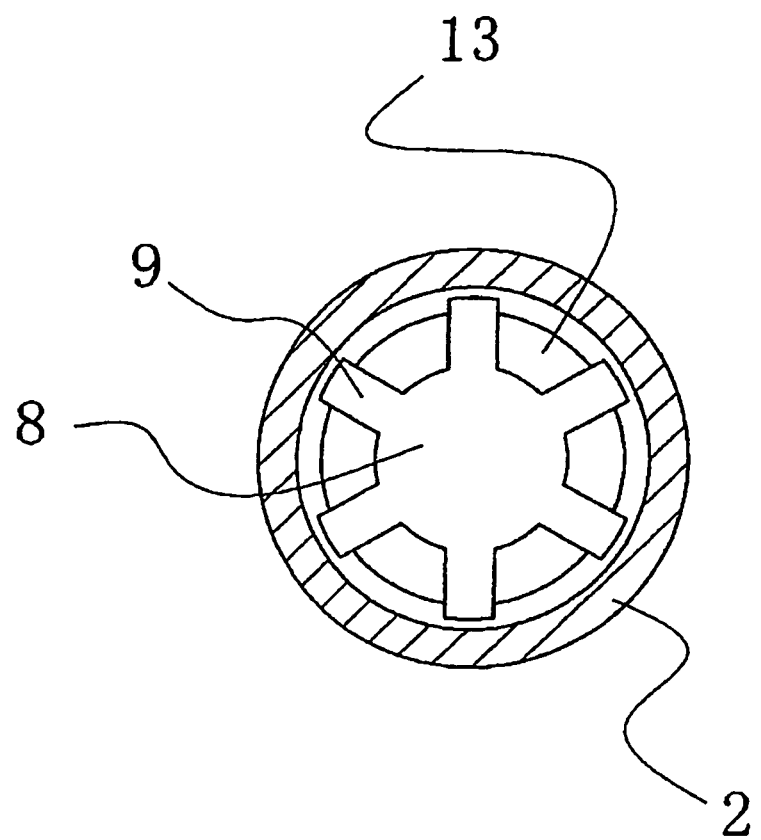
FIG. 4 is a cross-sectional arrow figure along the line II-II' in FIG. 3.

As for the ball receiving seat part 13 which is another ball transferred part, when a deeper concave is formed by the pressing of the ball 1, the area of the ball transferred part can be increased. In FIG. 4 which is a cross-sectional arrow view along the line II-II' in FIG. 3, although the depth dimension of the ball receiving seat part 13 cannot be estimated, when the ball receiving seat part 13 is deeply formed, the opening area of the center hole 8 can be increased and a large area can be ensured for the portion contacting with the ball. Accordingly, although preferable maximum value of the total area of the ball transferred part is 31% of the ball surface area, it is important for ensuring more abundant ink flow to keep a wide area for the portion other than the ball transferred part of the ball holding room 7 and open the radial groove 9 in the portion other than the ball transferred part of the ball holding room 7.

These front-end ball transferred part 12 and ball receiving seat part 13 are portions which are processed in order of loading of a ball, formation of front-end a ball transferred part, and formation of a ball receiving seat part. When the front-end ball transferred part 12 is extended to the rear as much as possible and the ball receiving seat part 13 is extended to a front position as much as possible, the positions of both parts formed are more approximated with each other. As both parts are more approximated with each other, the ball movable amount in the lateral direction becomes smaller than the movable amount in the longitudinal direction and the displacement amount of the ball 1 at the writing is decreased. Therefore, there is an effect that, for example, uncomfortable vibration is not generated during writing or the maximum writing resistance value can be kept low. Here, the maximum writing resistance value is the size of momentarily large writing resistance generated when the writing direction is changed. However, as described above, if the total area of the ball transferred part is excessively large, the space defining the ink pathway is reduced. Therefore, it is preferable that the portion L between the ball receiving seat as a ball transferred part and the front-end caulked part inner surface as a ball transferred part extends across the equatorial line of the ball when the ball is located in the rearmost part, and at the same time, the length of the portion between the parts is set to be from 24.0 to 34.0% of the diameter of the ball.

Furthermore, the surfaces of these ball transferred portions preferably have an average surface roughness (Ra) of 2 to 15 nm and a maximum-minimum height difference (Ry) of 20 to 200 nm. Since the ball transferred part is formed by the pressing of a ball, the profile of the ball surface is transferred. Therefore, the surface roughness of the ball transferred part can be adjusted by selecting the surface roughness of the ball used for formation of the ball transferred part. The ball for the formation of the ball transferred part need not be necessarily the same as the ball for writing and, for example, it may be also possible to take out the ball for the formation of the ball transferred part after forming the ball transferred part and load a ball for writhing. At this time, for preventing the escape of the ball for writing, a caulking process as a diameter reducing process is applied to the front end of the ball holder and at this caulking process, the inner surface of the ball holder need not be necessarily pressed to the ball. Also, the surface roughness of the front-end ball transferred part 12 can be adjusted by applying a caulking process using a ball which differs in the surface roughness from the ball for the formation of the ball transferred part.

Various ballpoint pen tips A to M were prepared using the above-described ballpoint tip by varying the conditions as in the following (1) to (4). The dimension of each ballpoint pen tip is shown in Table 1.

(1) Ballpoint pen tips prepared to differ in the total area of the ball transferred part by adjusting the areas of the front-end ball transferred part and the ball receiving seat part.

(2) Ballpoint pen tips prepared to differ in the ratio of the surface area of the ball transferred part of the front-end caulked part inner surface to the surface area of the ball transferred part of the ball receiving seat by adjusting the areas of the front-end ball transferred part and the ball receiving seat part.

(3) Ballpoint pen tips differing in the distance between the ball transferred part of the ball receiving seat and the ball transferred part of the front-end caulked part inner surface.

(4) Ball pen tips using balls 1 having a diameter of 1.0 mm, 0.7 mm, 0.5 mm or 0.3 mm.

Among these ballpoint pen tips, Ballpoint Pen Tips A to H are particularly preferred examples, wherein the total area of the ball transferred part is from 22 to 31% of the surface area of the ball 1.

Calculation of the total area of the ball transferred part was based on the following method.
(1) Area of Front-End Ball Transferred Part When the ball is regarded as a sphere, its surface area is equal to the surface area of a side wall of a cylinder circumscribing the sphere. Therefore, assuming that the diameter of the sphere is D, the surface area can be expressed by a product of the circumferential length $\pi D$ of a circle having a diameter D and the height D of the cylinder, namely, $\pi D^2$.

The surface area of the front-end ball transferred part corresponds to, out of the side wall of a cylinder circumscribing the sphere, the surface area of a side wall with a projected width of the belt-like portion of the front-end ball transferred part. Therefore, when the projected height of the front-end ball transferred part is T, the surface area becomes $\pi TD$.
(2) Area of Ball Receiving Seat Part (Total)

The surface area (total) of the ball receiving seat part becomes the area obtained by subtracting the area of the opening in the width portion corresponding to the radial groove from the area of the belt-like portion with a width defining the ball receiving seat part, out of the surface of the sphere.

The area of the belt-like portion with a width defining the ball receiving seat part similarly corresponds to the area of a side wall with a projected width of the belt-like portion of the ball receiving seat part, out of the side wall of a cylinder circumscribing the sphere. Therefore, when the projected height of the ball receiving seat part is H, the area becomes $\pi HD$.

The area of the opening for one radial groove is the portion corresponding to the ball receiving seat part portion, out of the belt-like portion with a widthwise length defining the radial groove centered on the equatorial line of the sphere. When the width dimension of the radial groove is F, the area of the belt-like portion with a width dimension of the radial groove centered on the equatorial line of the sphere becomes $\pi FD$.

Out of the belt-like portion with a width dimension of the radial groove centered on the equatorial line of the sphere, the ratio of the portion corresponding to the ball receiving seat part portion is the ratio of the angle formed at the center of the sphere, occupying in the entire circumference. Therefore, when the angle formed by the ball receiving seat part portion is $\theta$, the ratio is $(\theta/360°)$ and the area of the opening for one radial groove becomes $\pi FD(\theta/360°)$.

When the number of radial grooves is n, the total opening area for radial grooves is $n \cdot \pi FD(\theta/360°)$.
(3) Total Area of Ball Transferred Part Accordingly, the total area of the ball transferred part is calculated by the following formula:

$$\pi TD + \pi HD - n \cdot \pi FD(\theta/360°)$$

$\pi$: the ratio of the circumference of a circle to its diameter,
D: the diameter of ball,
T: the projected height of the front-end ball transferred part,
H: the projected height of the ball receiving seat part,
n: the number of radial grooves,
F: the width of the radial groove, and
$\theta$: the angle formed by the ball receiving seat part portion from the center of the ball.

In this connection, in the actual measurement, T: the projected height of the front-end ball transferred part, H: the projected height of the ball receiving seat part, and F: the width of the radial groove can be obtained by taking a photograph of the plane formed when the ballpoint pen tip is longitudinally cult in half, and $\theta$: the angle formed by the ball receiving seat part portion from the center of the ball can be guided by the Pythagorean theorem from the diameter of the ball receiving seat part, the diameter of the center hole and the diameter of the ball.

Using Inks A to W and Ballpoint Pen Tips A to M prepared above, as shown in Tables 2 and 3, ballpoint pens of Examples 1 to 33 and ballpoint pens of Comparative Examples 1 to 6 were produced. A coil spring giving a ball-biasing force of 20 gf was disposed in the ballpoint pen tip prepared, and the ballpoint pen tip was fixed to an ink storage pipe (a polypropylene-made extrusion-molded tube having an inner diameter or 1.75 mm and an outer diameter of 3.0 mm) of a 0.7-mm ball ballpoint pen, "Rolly" (product No.: BP127), manufactured by Pentel Co., Ltd. Subsequently, an oil-based ink (0.3 g) described later was filled in the ink storage pipe, and gases which is present in the writing tool were removed by applying a centrifugal treatment (1,000 rpm, 5 minutes) in a centrifugal separator (Desk Centrifuge H-103N, manufactured by Kokusan Co., Ltd.). The obtained ballpoint pen was used as the ballpoint pen test sample.

TABLE 1

| Ballpoint Pen Tip | Diameter D of Ball (mm) | Outer Diameter of Receiving Seat (mm) | Diameter of Center Hole (mm) | Width F of Radial Groove (mm) | Number n of Radial Grooves (lines) | Projected Height T of Front-End Ball Transferred part (mm) | Projected Height H of Ball Receiving Seat Part (mm) | Surface Area of Ball Transferred Part as Receiving Seat Part (mm$^2$) |
|---|---|---|---|---|---|---|---|---|
| Tip A | 0.7 | 0.620 | 0.36 | 0.10 | 6 | 0.070 | 0.138 | 0.188 |
| Tip B | 0.7 | 0.620 | 0.36 | 0.10 | 6 | 0.080 | 0.138 | 0.188 |
| Tip C | 0.5 | 0.430 | 0.23 | 0.07 | 5 | 0.060 | 0.094 | 0.100 |
| Tip D | 0.3 | 0.265 | 0.18 | 0.06 | 3 | 0.040 | 0.050 | 0.035 |
| Tip E | 0.7 | 0.630 | 0.36 | 0.10 | 6 | 0.100 | 0.148 | 0.203 |
| Tip F | 0.7 | 0.630 | 0.36 | 0.10 | 6 | 0.110 | 0.148 | 0.203 |
| Tip G | 0.7 | 0.635 | 0.36 | 0.10 | 6 | 0.120 | 0.153 | 0.211 |
| Tip H | 1.0 | 0.910 | 0.60 | 0.11 | 6 | 0.170 | 0.193 | 0.440 |
| Tip I | 0.7 | 0.620 | 0.36 | 0.10 | 6 | 0.060 | 0.138 | 0.188 |
| Tip J | 0.7 | 0.620 | 0.36 | 0.10 | 6 | 0.065 | 0.138 | 0.188 |
| Tip K | 0.7 | 0.635 | 0.36 | 0.10 | 6 | 0.130 | 0.153 | 0.211 |
| Tip L | 0.7 | 0.635 | 0.36 | 0.10 | 6 | 0.135 | 0.153 | 0.211 |
| Tip M | 0.7 | 0.59 | 0.33 | 0.10 | 5 | 0.140 | 0.120 | 0.120 |

| Ballpoint Pen Tip | Surface Area of Ball transferred Part as Inner Wall Surface of Front-End Caulked Part (mm$^2$) | Total Surface Area of Ball Transferred Part (mm$^2$) | Ratio of Total Surface Area of Ball Transferred Area to Surface Area of Ball (%) | Ratio of Surface Area of Ball Transferred Part in Front-End Caulked Part to Surface Area of Receiving Seat Part | Ratio of Distance Between Transferred Part of Receiving Seat Part and Transferred Part of Front-End Caulked Part to Diameter of Ball (%) |
|---|---|---|---|---|---|
| Tip A | 0.154 | 0.342 | 22.2 | 0.83 | 33.9 |
| Tip B | 0.176 | 0.364 | 23.6 | 0.94 | 32.5 |
| Tip C | 0.094 | 0.194 | 24.7 | 0.95 | 32.9 |
| Tip D | 0.038 | 0.073 | 25.7 | 1.08 | 31.8 |
| Tip E | 0.220 | 0.423 | 27.5 | 1.08 | 28.2 |
| Tip F | 0.242 | 0.445 | 28.9 | 1.19 | 26.8 |
| Tip G | 0.264 | 0.475 | 30.8 | 1.25 | 24.6 |
| Tip H | 0.534 | 0.974 | 31.0 | 1.21 | 24.2 |
| Tip I | 0.132 | 0.320 | 20.8 | 0.70 | 35.4 |
| Tip J | 0.143 | 0.331 | 21.5 | 0.76 | 34.6 |
| Tip K | 0.286 | 0.497 | 32.3 | 1.36 | 23.2 |
| Tip L | 0.297 | 0.508 | 33.0 | 1.41 | 22.5 |
| Tip M | 0.308 | 0.483 | 31.4 | 1.76 | 28.3 |

The ballpoint pens produced were subjected to the following tests. The results are shown together in Tables 2 and 3.

Measurement of Ball Sunken Amount:

By using n=5 ballpoint pens for each of the ballpoint pens of Examples and Comparative Examples, writing of 400 m was performed by a spiral writing testing machine (writing angle: 70°, load: 150 g, writing speed: 7 cm/sec), followed by measurement of the distance from the front end of the ball holder holding the ball of the ballpoint pen tip to the front end of the ball in the direction perpendicular to the cross-section. The difference from the ballpoint pen before writing was taken as the ball sunken amount. The numerical value is a value calculated as the average of n=5.

Ink Discharge Amount:

By using n=5 ballpoint pens for each of the ballpoint pens of Examples and Comparative Examples, writing of 400 m was performed by a spiral writing testing machine (writing angle: 70°, load: 150 g, writing speed: 7 cm/sec). The weight of the ballpoint pen was measured every 200 m, and the decrease in the weight of the ink was taken as the ink discharge amount.

Measurement of Writing Resistance Value:

By using n=5 ballpoint pens for each of the test ballpoint pens where Inks A to W were filled, respectively, the ballpoint pen was loaded in an outer case of a 0.7-mm ball ballpoint pen, "Rolly" (product No.: BP127), manufactured by Pentel Co., Ltd. and used for writing by putting the ball of the ballpoint pen tip to abut on a paper surface with holding the middle of the outer case, and moving the paper. The size of the force causing the ballpoint pen body to be pulled toward the paper moving direction by the movement of paper was measured by a measuring machine (Tribo-master (Type: TL201Sa), manufactured by Trinity lab Co., Ltd.) wherein the load in the writing direction is sensed by a load cell provided in the outer case-holding portion. The measurement was performed by writing 15 cm for each of a pen unused for writing after its preparation and a pen after spiral writing of 400 m (spiral writing conditions: writing angle: 70°, load: 150 g, writing speed: 7 cm/sec), and 400 measured values detected in steps of 0.005 sec between 0.005 sec and 2.0 sec were averaged. The value obtained was taken as the average writing resistance value.

At the measurement of writing resistance value, writing was performed under two writing angle conditions of 90° and 70°, and other conditions were a writing load of 150 g and a writing speed of 7 cm/sec.

Figure 5:
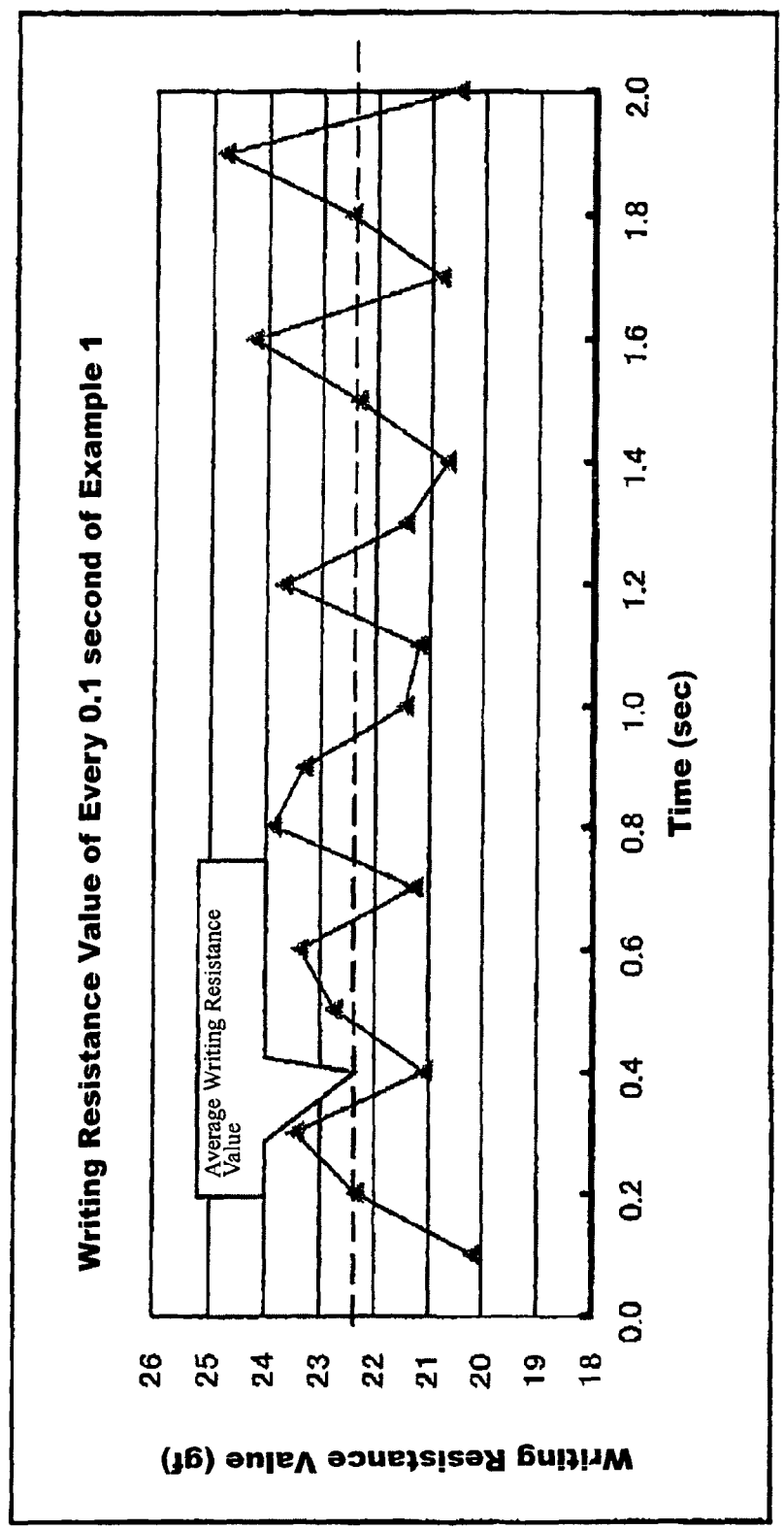
FIG. 5 is a graph showing the writing resistance value of every 0.1 second of Example 1.

Measurement of Smoothness of Writing:

As regards the vibration perceived by the human, the resistance value difference occurring at intervals of less than 0.1 seconds does not greatly impair the writing feel. Therefore, the measured values obtained were compared as an average value for every 0.1 seconds. FIG. 5 is the graph showing one example thereof (Example 1). Particularly, when the average value of the difference between adjacent resistance values which are higher than the average writing resistance value is 1.5 g or more, a faint vibration giving an uneven feel during writing is readily sensed and is liable to be recognized as a bad writing feel. Therefore, the average value of the difference between adjacent resistance values higher than the average writing resistance value was calculated for every 0.1 seconds.

Sensory Test of Writing Feel (Softness and Smoothness of Writing Feel)

The writing feel was evaluated through a sensory test by manual writing with 20 monitors for two types by using a pen unused for writing after its preparation and a pen after spiral writing of 400 m (spiral writing conditions: writing angle: 70°, load: 150 g, writing speed: 7 cm/sec).

The evaluation was performed according to the criteria: heavy or unsmooth (1 point); soft but unsmooth, or smooth but heavy (2 points); soft and smooth (3 points); and very soft and smooth (4 points). The average value of 20 monitors was calculated.

Patchiness of Handwriting:

Using n=5 ballpoint pens for each of the ballpoint pens of Examples and Comparative Examples, the number of starved handwritings was confirmed with an eye after writing of 400 m by a spiral writing testing machine (writing angle: 70°, load: 150 g, writing speed: 7 cm/sec).

Presence or Absence of Contact of Front End of Ball Holder with Paper Surface:

By using n=5 ballpoint pens for each of the ballpoint pens of Examples and Comparative Examples, whether or not the front end of the ball holder was contacted with paper surface during writing of 400 m by a spiral writing testing machine (writing angle: 70°, load: 150 g, writing speed: 7 cm/sec) was confirmed with an eye.

TABLE 2

| Ballpoint Pen Test Sample | Ink | Ballpoint Pen Tip | Ball Sunken Amount (mm) | Ink Discharge Amount (g/200 m) from 0 to 200 m | Ink Discharge Amount (g/200 m) from 200 to 400 m | Writing Resistance Value (gf) Writing Angle 90° Unused for Writing | Writing Resistance Value (gf) Writing Angle 90° After Writing of 400 m | Writing Resistance Value (gf) Writing Angle 70° Unused for Writing | Writing Resistance Value (gf) Writing Angle 70° After Writing of 400 m |
|---|---|---|---|---|---|---|---|---|---|
| Example 1 | A | E | 0.014 | 0.085 | 0.085 | 27.9 | 25.3 | 22.3 | 20.8 |
| Example 2 | B | E | 0.023 | 0.056 | 0.058 | 28.1 | 28.9 | 22.8 | 23.9 |
| Example 3 | C | E | 0.009 | 0.101 | 0.105 | 31.7 | 29.2 | 24.8 | 23.2 |
| Example 4 | D | E | 0.005 | 0.072 | 0.069 | 31.3 | 29.0 | 24.8 | 22.7 |
| Example 5 | E | E | 0.030 | 0.074 | 0.060 | 32.9 | 36.3 | 26.4 | 28.4 |
| Example 6 | A | M | 0.015 | 0.035 | 0.035 | 27.1 | 24.7 | 21.6 | 20.4 |
| Example 7 | B | M | 0.025 | 0.028 | 0.027 | 27.4 | 28.2 | 22.6 | 23.3 |
| Example 8 | C | M | 0.110 | 0.041 | 0.046 | 30.8 | 28.7 | 24.4 | 22.9 |
| Example 9 | D | M | 0.007 | 0.034 | 0.032 | 30.6 | 28.1 | 24.4 | 21.9 |
| Example 10 | E | M | 0.031 | 0.036 | 0.028 | 32.3 | 35.4 | 25.9 | 27.9 |
| Example 11 | F | E | 0.014 | 0.083 | 0.083 | 27.6 | 24.9 | 22.0 | 20.5 |
| Example 12 | G | E | 0.014 | 0.078 | 0.078 | 27.4 | 24.8 | 21.8 | 20.1 |
| Example 13 | H | E | 0.009 | 0.074 | 0.069 | 30.2 | 28.8 | 23.9 | 20.6 |
| Example 14 | I | E | 0.017 | 0.058 | 0.060 | 27.4 | 26.9 | 21.2 | 19.6 |
| Example 15 | J | E | 0.015 | 0.063 | 0.065 | 26.9 | 26.1 | 20.8 | 19.4 |
| Example 16 | K | E | 0.018 | 0.076 | 0.074 | 26.9 | 25.7 | 24.3 | 23.5 |
| Example 17 | L | E | 0.014 | 0.083 | 0.083 | 27.5 | 25.1 | 21.9 | 20.5 |
| Example 18 | M | E | 0.005 | 0.069 | 0.069 | 29.4 | 28.7 | 24.6 | 22.4 |
| Example 19 | N | E | 0.008 | 0.074 | 0.074 | 33.2 | 32.0 | 26.7 | 26.0 |
| Example 20 | O | E | 0.023 | 0.060 | 0.060 | 30.4 | 29.7 | 23.9 | 22.8 |

| Ballpoint Pen Test Sample | Sensory Test of Writing Feel Unused for Writing | Sensory Test of Writing Feel After Writing of 400 m | Presence of Absence of Pachiness of Handwriting | Presence or Absence of Contact of Front End of Ballpoint Pen Holder with Paper Surface | Smoothness of Writing (gf) |
|---|---|---|---|---|---|
| Example 1 | 3.9 | 3.9 | none | none | 1.12 |
| Example 2 | 3.7 | 3.8 | 1 | none | 1.17 |
| Example 3 | 3.3 | 2.8 | none | none | 1.36 |
| Example 4 | 3.2 | 3.4 | none | none | 1.41 |
| Example 5 | 3.1 | 3.2 | 2 | none | 1.42 |
| Example 6 | 3.7 | 3.5 | 6 | none | 1.25 |
| Example 7 | 3.2 | 3.0 | 10 | none | 1.32 |
| Example 8 | 3.0 | 2.5 | 5 | none | 1.45 |
| Example 9 | 3.1 | 3.4 | 5 | none | 1.49 |
| Example 10 | 3.0 | 3.0 | 12 | none | 1.47 |
| Example 11 | 3.8 | 3.3 | none | none | 1.09 |
| Example 12 | 3.9 | 3.4 | none | none | 1.07 |
| Example 13 | 3.9 | 3.4 | none | none | 1.44 |
| Example 14 | 3.8 | 3.3 | 1 | none | 1.08 |
| Example 15 | 3.7 | 3.2 | none | none | 1.04 |
| Example 16 | 3.0 | 3.3 | none | none | 1.36 |
| Example 17 | 3.7 | 3.2 | none | none | 1.16 |
| Example 18 | 3.3 | 2.8 | none | none | 1.39 |
| Example 19 | 2.8 | 3.0 | none | none | 1.43 |
| Example 20 | 3.4 | 3.5 | 2 | none | 1.25 |

TABLE 3

| Ballpoint Pen Test Sample | Ball-point Ink | Ballpoint Pen Tip | Ball Sunken Amount (mm) | Ink Discharge Amount (g/200 m) (0 to 200 m) | Ink Discharge Amount (g/200 m) (200 to 400 m) | Writing Resistance Value (gf) Writing Angle 90° Unused for Writing | Writing Resistance Value (gf) Writing Angle 90° After Writing of 400 m | Writing Resistance Value (gf) Writing Angle 70° Unused for Writing | Writing Resistance Value (gf) Writing Angle 70° After Writing of 400 m |
|---|---|---|---|---|---|---|---|---|---|
| Example 21 | P | E | 0.012 | 0.082 | 0.083 | 28.1 | 24.9 | 22.6 | 20.9 |
| Example 22 | Q | E | 0.016 | 0.079 | 0.082 | 26.7 | 24.9 | 22.1 | 20.9 |
| Example 23 | A | A | 0.015 | 0.085 | 0.086 | 32.4 | 30.4 | 25.5 | 24.3 |
| Example 24 | A | B | 0.014 | 0.087 | 0.087 | 30.3 | 28.2 | 23.8 | 22.5 |
| Example 25 | A | C | 0.014 | 0.050 | 0.051 | 29.9 | 27.7 | 23.7 | 22.4 |
| Example 26 | A | D | 0.015 | 0.032 | 0.032 | 29.3 | 27.0 | 23.3 | 21.9 |
| Example 27 | A | F | 0.013 | 0.081 | 0.080 | 28.4 | 25.8 | 23.1 | 21.5 |
| Example 28 | A | G | 0.013 | 0.076 | 0.074 | 25.9 | 23.1 | 20.9 | 19.2 |
| Example 29 | A | H | 0.012 | 0.098 | 0.097 | 26.1 | 23.2 | 21.1 | 19.4 |
| Example 30 | A | I | 0.018 | 0.086 | 0.087 | 38.2 | 36.3 | 30.8 | 29.7 |
| Example 31 | A | J | 0.015 | 0.088 | 0.088 | 38.1 | 36.1 | 30.9 | 29.7 |
| Example 32 | A | K | 0.012 | 0.073 | 0.071 | 26.6 | 23.6 | 21.8 | 20.0 |
| Example 33 | A | L | 0.012 | 0.072 | 0.071 | 26.1 | 23.1 | 21.4 | 19.6 |
| Comparative Example 1 | R | E | 0.072 | 0.083 | 0.045 | 29.9 | 46.4 | 23.1 | 37.4 |
| Comparative Example 2 | S | E | 0.070 | 0.081 | 0.051 | 31.1 | 36.1 | 24.5 | 30.4 |
| Comparative Example 3 | T | E | 0.057 | 0.103 | 0.078 | 33.2 | 40.0 | 25.9 | 34.8 |
| Comparative Example 4 | U | E | 0.035 | 0.067 | 0.034 | 38.9 | 41.0 | 30.9 | 39.8 |
| Comparative Example 5 | V | E | 0.087 | 0.080 | 0.055 | 35.0 | 38.0 | 33.1 | 37.8 |
| Comparative Example 6 | W | E | 0.055 | 0.095 | 0.060 | 30.0 | 31.8 | 24.4 | 31.3 |

| Ballpoint Pen Test Sample | Sensory Test of Writing Feel Unused for Writing | Sensory Test of Writing Feel After Writing of 400 m | Presence of Absence of Pachiness of Handwriting | Presence or Absence of Contact of Front End of Ballpoint Pen Holder with Paper Surface | Smoothness of Writing (gf) |
|---|---|---|---|---|---|
| Example 21 | 3.8 | 3.3 | none | none | 1.15 |
| Example 22 | 3.3 | 2.8 | none | none | 1.29 |
| Example 23 | 3.2 | 3.5 | none | none | 1.48 |
| Example 24 | 3.2 | 3.3 | none | none | 1.33 |
| Example 25 | 3.5 | 3.5 | none | none | 1.47 |
| Example 26 | 3.4 | 3.6 | none | none | 1.33 |
| Example 27 | 3.8 | 3.9 | none | none | 0.98 |
| Example 28 | 3.8 | 3.7 | none | none | 0.91 |
| Example 29 | 3.7 | 3.7 | none | none | 0.82 |
| Example 30 | 3.2 | 3.4 | 1 | none | 1.72 |
| Example 31 | 3.1 | 3.4 | none | none | 1.59 |
| Example 32 | 3.5 | 3.5 | none | none | 0.83 |
| Example 33 | 3.9 | 3.8 | none | none | 0.51 |
| Comparative Example 1 | 3.7 | 1.2 | 48 | contacted | 1.53 |
| Comparative Example 2 | 3.2 | 1.4 | 57 | contacted | 1.51 |
| Comparative Example 3 | 3.4 | 2.9 | 36 | contacted | 1.75 |
| Comparative Example 4 | 2.3 | 1.8 | none | contacted | 1.86 |
| Comparative Example 5 | 2.5 | 0.9 | 123 | contacted | 2.01 |
| Comparative Example 6 | 3.5 | 2.4 | 85 | contacted | 1.68 |

As seen from the results in Tables 2 and 3, in all of the ballpoint pens of Examples 1 to 33, the writing resistance value was not changed according to the writing distance and a smooth writing feel could be maintained. On the other hand, in Comparative Examples 1 to 6, the writing resistance value after writing of 400 m was increased in comparison with the writing resistance value of unused for writing. These results are considered to be obtained since by using the ink of the present invention, a lubricating film can be firmly maintained between the ball and the ball receiving seat which enables suppressing the abrasion of the ball or ball receiving seat to reduce the ball sunken amount. It can be also confirmed by the fact that the ball sunken amount in Examples 1 to 33 of Tables 2 and 3 is smaller than the ball sunken amount in Comparative Examples 1 to 6. In this connection, the ball sinking is an index making it possible to know the degree of abrasion by measuring the sunken amount since when the ball receiving seat is abraded by the ball, the ball is sunken to the ball receiving seat direction.

In this way, according to the ballpoint pen of the present invention, the ball sunken amount associated with writing is small. Therefore, the ball causes no clogging of the ink pathway. Thus, the ink discharge amount is substantially stable irrespective of the writing distance and there is no patchiness in handwriting. Also, since ball sinking scarcely occurs, even after writing of 400 m, the front end of the ball holder is kept from abutting on the paper surface and a smooth writing feel is obtained to achieve a high evaluation in the sensory test.

As described in detail in the foregoing pages, the ink of the present invention is a ballpoint pen ink ensuring that a very soft and smooth writing feel can be obtained even when a strong writing pressure is applied, and at the same time, even long-distance writing does not involve deterioration of the writing feel and causes substantially no change in the discharge amount, writing resistance value and furthermore, writing feel at the sensory test.

DESCRIPTION OF REFERENCE NUMERALS AND SIGNS

1 Ball
2 Ball holder
   2a Front end opening
2b Rear end opening
3 Ink storage part
4 Oil-based ink
5 Backflow inhibitor composition
6 Coil spring
6a Coil part
6b Straight end part
7 Ball holding room
8 Center hole
9 Radial groove
10 Rear hole
11 Inwardly protruding part
12 Front-end ball transferred part
13 Ball receiving seat as ball transferred part

The invention claimed is:

1. A ballpoint pen ink containing at least a colorant, a liquid medium in which 50% by weight or more of the liquid medium is an organic solvent, polyoxyethylene castor oil, polyoxyethylene hardened castor oil or a derivative thereof represented by the following formula (I), and one kind of a compound or a mixture of two or more kinds of compounds selected from any of the compounds represented by the following formulae (II), (III) and (IV):

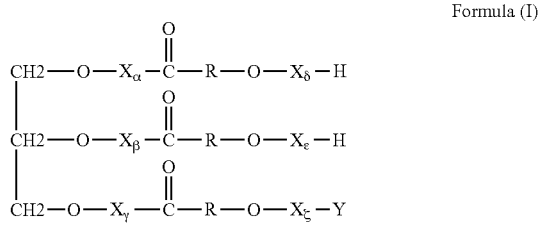

Formula (I)

(X: an ethylene oxide group, $CH_2CH_2O$,
Y: H, CR or $COCH_2CH_2COOH$,
R: a fatty acid or hydroxyl group-containing fatty acid having C12 or more,
$\alpha+\beta+\gamma=$an integer of 1 or more,
$\delta+\epsilon+\xi=$an integer of 1 or more), more, and
$\alpha+\beta+\gamma+\delta+\epsilon+\xi<80$);

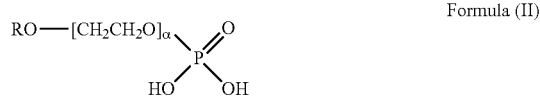

Formula (II)

(R: an alkyl group or a phenyl group, and
$\alpha$: an integer of 0 or more);

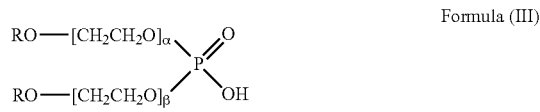

Formula (III)

(R: an alkyl group or a phenyl group, and
$\alpha+\beta=$an integer of 0 or more); and

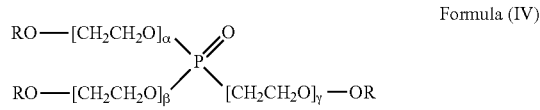

Formula (IV)

(R: an alkyl group or a phenyl group, and
$\alpha+\beta+\gamma=$an integer of 0 or more).

2. A ballpoint pen ink according to claim 1; wherein the value obtained by dividing the weight of the compound of formula (I) in the ink by the combined weight of the compounds of formulae (II), (III) and (IV) is from 0.1 to 100.

3. A ballpoint pen ink according to claim 2; wherein the value obtained by dividing the weight of the compound of formula (I) in the ink by the combined weight of the compounds of formulae (II), (III) and (IV) is from 0.1 to 20.

4. A ballpoint pen ink according to claim 1; wherein the organic solvent is an alcohol-based and/or a glycol-based organic solvent.

5. A ballpoint pen ink according to claim 1; further comprising at least one of a butyral resin, a styrene acrylic resin and a ketone resin.

6. A ballpoint pen ink according to claim 2; wherein the organic solvent is an alcohol-based and/or a glycol-based organic solvent.

7. A ballpoint pen ink according to claim 2; further comprising at least one of a butyral resin, a styrene acrylic resin and a ketone resin.

8. An ink composition for ballpoint pens, the ink composition comprising:
a coloring agent;
a liquid medium in which 50% by weight or more of the liquid medium is an organic solvent;
a polyoxyethylene castor oil and/or a polyoxyethylene hardened castor oil, or a derivative thereof represented by the formula:

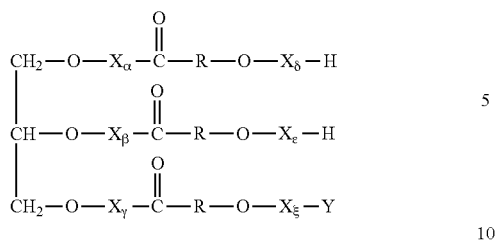

where:
X: an ethylene oxide group, $CH_2CH_2O$,
Y: H, CR or $COCH_2CH_2COOH$,
R: a fatty acid or hydroxyl group-containing fatty acid having C12 or more,
$\alpha+\beta+\gamma$=an integer of 1 or more,
$\delta+\epsilon+\xi$=an integer of 1 or more, and
$\alpha+\beta+\gamma+\delta+\epsilon+\xi<80$; and
one compound or a mixture of two or more compounds selected from the group consisting of a monoalkyl ether phosphoric acid, a polyoxyethylene monoalkyl ether phosphoric acid, a dialkyl ether phosphoric acid, a polyoxyethylene dialkyl ether phosphoric acid, a trialkyl ether phosphoric acid, and a polyoxyethylene trialkyl ether phosphoric acid.

9. An ink composition for ballpoint pens according to claim 8; wherein the organic solvent is an alcohol-based and/or a glycol-based organic solvent.

10. An ink composition for ballpoint pens according to claim 9; further comprising at least one of a butyral resin, a styrene acrylic resin and a ketone resin.

* * * * *